US008180928B2

(12) United States Patent
Elzur et al.

(10) Patent No.: US 8,180,928 B2
(45) Date of Patent: May 15, 2012

(54) METHOD AND SYSTEM FOR SUPPORTING READ OPERATIONS WITH CRC FOR ISCSI AND ISCSI CHIMNEY

(75) Inventors: Uri Elzur, Irvine, CA (US); Kan Frankie Fan, Diamond Bar, CA (US); Scott McDaniel, Villa Park, CA (US)

(73) Assignee: Broadcom Corporation, Irvine, CA (US)

( * ) Notice: Subject to any disclaimer, the term of this patent is extended or adjusted under 35 U.S.C. 154(b) by 1237 days.

(21) Appl. No.: 11/156,206

(22) Filed: Jun. 17, 2005

(65) Prior Publication Data

US 2006/0015655 A1    Jan. 19, 2006

Related U.S. Application Data

(63) Continuation-in-part of application No. 10/652,267, filed on Aug. 29, 2003, now Pat. No. 7,346,701.

(60) Provisional application No. 60/408,617, filed on Sep. 6, 2002, provisional application No. 60/407,165, filed on Aug. 30, 2002, provisional application No. 60/456,260, filed on Mar. 20, 2003, provisional application No. 60/456,265, filed on Mar. 20, 2003, provisional application No. 60/580,977, filed on Jun. 17, 2004, provisional application No. 60/660,750, filed on Mar. 11, 2005.

(51) Int. Cl.
*G06F 3/00* (2006.01)
(52) U.S. Cl. ............... 710/5; 709/212; 710/22
(58) Field of Classification Search ........ 710/5
See application file for complete search history.

(56) References Cited

U.S. PATENT DOCUMENTS

| 4,333,020 A | 6/1982 | Maeder |
| 4,395,774 A | 7/1983 | Rapp |
| 4,433,378 A | 2/1984 | Leger |
| 4,445,051 A | 4/1984 | Elmasry |

(Continued)

FOREIGN PATENT DOCUMENTS

EP    0465090 B1    4/1996

(Continued)

OTHER PUBLICATIONS

Tom Talpey, Chet Juszczak, NFS RDMA Problem Statement, Feb. 2005.

(Continued)

*Primary Examiner* — Henry Tsai
*Assistant Examiner* — Michael Sun
(74) *Attorney, Agent, or Firm* — Thomas, Kayden, Horstemeyer & Risley, LLP

(57) ABSTRACT

Certain embodiments of the invention may be found in a method and system for performing SCSI read operations with a CRC via a TCP offload engine. Aspects of the method may comprise receiving an iSCSI read command from an initiator. Data may be fetched from a buffer based on the received iSCSI read command. The fetched data may be zero copied from the buffer to the initiator and a TCP sequence may be retransmitted to the initiator. A digest value may be calculated, which may be communicated to the initiator. An accumulated digest value stored in a temporary buffer may be utilized to calculate a final digest value, if the buffer is posted. The retransmitted TCP sequence may be processed and the fetched data may be zero copied into an iSCSI buffer, if the buffer is posted. The calculated final digest value may be communicated to the initiator.

20 Claims, 8 Drawing Sheets

U.S. PATENT DOCUMENTS

| | | |
|---|---|---|
| 4,449,248 A | 5/1984 | Leslie |
| 4,463,424 A | 7/1984 | Mattson |
| 4,519,068 A | 5/1985 | Krebs |
| 4,545,023 A | 10/1985 | Mizzi |
| 4,590,550 A | 5/1986 | Eilert |
| 4,599,526 A | 7/1986 | Paski |
| 4,649,293 A | 3/1987 | Ducourant |
| 4,680,787 A | 7/1987 | Marry |
| 4,717,838 A | 1/1988 | Brehmer |
| 4,721,866 A | 1/1988 | Chi |
| 4,727,309 A | 2/1988 | Vajdic |
| 4,737,975 A | 4/1988 | Shafer |
| 4,760,571 A | 7/1988 | Schwarz |
| 4,761,822 A | 8/1988 | Maile |
| 4,777,657 A | 10/1988 | Gillaspie |
| 4,791,324 A | 12/1988 | Hodapp |
| 4,794,649 A | 12/1988 | Fujiwara |
| 4,804,954 A | 2/1989 | Macnak |
| 4,806,796 A | 2/1989 | Bushey |
| 4,807,282 A | 2/1989 | Kazan |
| 4,817,054 A | 3/1989 | Banerjee |
| 4,817,115 A | 3/1989 | Campo |
| 4,821,034 A | 4/1989 | Anderson |
| 4,850,009 A | 7/1989 | Zook |
| 4,890,832 A | 1/1990 | Komaki |
| 4,894,792 A | 1/1990 | Mitchell |
| 4,916,441 A | 4/1990 | Gombrich |
| 4,964,121 A | 10/1990 | Moore |
| 4,969,206 A | 11/1990 | Desrochers |
| 4,970,406 A | 11/1990 | Fitzpatrick |
| 4,977,611 A | 12/1990 | Maru |
| 4,995,099 A | 2/1991 | Davis |
| 5,008,879 A | 4/1991 | Fischer |
| 5,025,486 A | 6/1991 | Klughart |
| 5,029,183 A | 7/1991 | Tymes |
| 5,031,231 A | 7/1991 | Miyazaki |
| 5,033,109 A | 7/1991 | Kawano |
| 5,041,740 A | 8/1991 | Smith |
| 5,055,659 A | 10/1991 | Hendrick |
| 5,055,660 A | 10/1991 | Bertagna |
| 5,079,452 A | 1/1992 | Lain |
| 5,081,402 A | 1/1992 | Koleda |
| 5,087,099 A | 2/1992 | Stolarczyk |
| 5,115,151 A | 5/1992 | Hull |
| 5,117,501 A | 5/1992 | Childress |
| 5,119,502 A | 6/1992 | Kallin |
| 5,121,408 A | 6/1992 | Cai |
| 5,122,689 A | 6/1992 | Barre |
| 5,123,029 A | 6/1992 | Bantz |
| 5,128,938 A | 7/1992 | Borras |
| 5,134,347 A | 7/1992 | Koleda |
| 5,142,573 A | 8/1992 | Umezawa |
| 5,149,992 A | 9/1992 | Allstot |
| 5,150,361 A | 9/1992 | Wieczorek |
| 5,152,006 A | 9/1992 | Klaus |
| 5,153,878 A | 10/1992 | Krebs |
| 5,162,674 A | 11/1992 | Allstot |
| 5,175,870 A | 12/1992 | Mabey |
| 5,177,378 A | 1/1993 | Nagasawa |
| 5,179,721 A | 1/1993 | Comroe |
| 5,181,200 A | 1/1993 | Harrison |
| 5,196,805 A | 3/1993 | Beckwith |
| 5,216,295 A | 6/1993 | Hoang |
| 5,230,084 A | 7/1993 | Nguyen |
| 5,239,662 A | 8/1993 | Danielson |
| 5,241,542 A | 8/1993 | Natarajan |
| 5,241,691 A | 8/1993 | Owen |
| 5,247,656 A | 9/1993 | Kabuo |
| 5,249,220 A | 9/1993 | Moskowitz |
| 5,249,302 A | 9/1993 | Metroka |
| 5,265,238 A | 11/1993 | Canova |
| 5,265,270 A | 11/1993 | Stengel |
| 5,274,666 A | 12/1993 | Dowdell |
| 5,276,680 A | 1/1994 | Messenger |
| 5,278,831 A | 1/1994 | Mabey |
| 5,289,055 A | 2/1994 | Razavi |
| 5,289,469 A | 2/1994 | Tanaka |
| 5,291,516 A | 3/1994 | Dixon |
| 5,293,639 A | 3/1994 | Wilson |
| 5,296,849 A | 3/1994 | Ide |
| 5,297,144 A | 3/1994 | Gilbert |
| 5,301,196 A | 4/1994 | Ewen |
| 5,304,869 A | 4/1994 | Greason |
| 5,315,591 A | 5/1994 | Brent |
| 5,323,392 A | 6/1994 | Ishii |
| 5,329,192 A | 7/1994 | Wu |
| 5,331,509 A | 7/1994 | Kikinis |
| 5,345,449 A | 9/1994 | Buckingham |
| 5,349,649 A | 9/1994 | Iijima |
| 5,355,453 A | 10/1994 | Row |
| 5,361,397 A | 11/1994 | Wright |
| 5,363,121 A | 11/1994 | Freund |
| 5,373,149 A | 12/1994 | Rasmussen |
| 5,373,506 A | 12/1994 | Tayloe |
| 5,390,206 A | 2/1995 | Rein |
| 5,392,023 A | 2/1995 | D'Avello |
| 5,406,615 A | 4/1995 | Miller |
| 5,406,643 A | 4/1995 | Burke |
| 5,418,837 A | 5/1995 | Johansson |
| 5,420,529 A | 5/1995 | Guay |
| 5,423,002 A | 6/1995 | Hart |
| 5,426,637 A | 6/1995 | Derby |
| 5,428,636 A | 6/1995 | Meier |
| 5,430,845 A | 7/1995 | Rimmer |
| 5,432,932 A | 7/1995 | Chen |
| 5,434,518 A | 7/1995 | Sinh |
| 5,437,329 A | 8/1995 | Brooks |
| 5,440,560 A | 8/1995 | Rypinski |
| 5,455,527 A | 10/1995 | Murphy |
| 5,457,412 A | 10/1995 | Tamba |
| 5,459,412 A | 10/1995 | Mentzer |
| 5,465,081 A | 11/1995 | Todd |
| 5,473,607 A | 12/1995 | Hausman |
| 5,481,265 A | 1/1996 | Russell |
| 5,481,562 A | 1/1996 | Pearson |
| 5,488,319 A | 1/1996 | Lo |
| 5,502,719 A | 3/1996 | Grant |
| 5,510,734 A | 4/1996 | Sone |
| 5,510,748 A | 4/1996 | Erhart |
| 5,519,695 A | 5/1996 | Purohit |
| 5,521,530 A | 5/1996 | Yao |
| 5,533,029 A | 7/1996 | Gardner |
| 5,535,373 A | 7/1996 | Olnowich |
| 5,544,222 A | 8/1996 | Robinson |
| 5,548,230 A | 8/1996 | Gerson |
| 5,548,238 A | 8/1996 | Zhang |
| 5,550,491 A | 8/1996 | Furuta |
| 5,576,644 A | 11/1996 | Pelella |
| 5,579,487 A | 11/1996 | Meyerson |
| 5,583,456 A | 12/1996 | Kimura |
| 5,584,048 A | 12/1996 | Wieczorek |
| 5,600,267 A | 2/1997 | Wong |
| 5,603,051 A | 2/1997 | Ezzet |
| 5,606,268 A | 2/1997 | Van Brunt |
| 5,619,497 A | 4/1997 | Gallagher |
| 5,619,650 A | 4/1997 | Bach |
| 5,625,308 A | 4/1997 | Matsumoto |
| 5,628,055 A | 5/1997 | Stein |
| 5,630,061 A | 5/1997 | Richter |
| 5,640,356 A | 6/1997 | Gibbs |
| 5,640,399 A | 6/1997 | Rostoker |
| 5,668,809 A | 9/1997 | Rostoker |
| 5,675,584 A | 10/1997 | Jeong |
| 5,675,585 A | 10/1997 | Bonnot |
| 5,680,038 A | 10/1997 | Fiedler |
| 5,680,633 A | 10/1997 | Koenck |
| 5,689,644 A | 11/1997 | Chou |
| 5,724,361 A | 3/1998 | Fiedler |
| 5,726,588 A | 3/1998 | Fiedler |
| 5,732,346 A | 3/1998 | Lazaridis |
| 5,740,366 A | 4/1998 | Mahany |
| 5,742,604 A | 4/1998 | Edsall |
| 5,744,366 A | 4/1998 | Kricka |
| 5,744,999 A | 4/1998 | Kim |
| 5,748,631 A | 5/1998 | Bergantino |
| 5,754,549 A | 5/1998 | DeFoster |
| 5,767,699 A | 6/1998 | Bosnyak |

| | | | | | | | |
|---|---|---|---|---|---|---|---|
| 5,778,414 | A | 7/1998 | Winter | 6,223,239 | B1 | 4/2001 | Olarig |
| 5,796,727 | A | 8/1998 | Harrison | 6,226,680 | B1 | 5/2001 | Boucher |
| 5,798,658 | A | 8/1998 | Werking | 6,232,844 | B1 | 5/2001 | Talaga |
| 5,802,258 | A | 9/1998 | Chen | 6,243,386 | B1 | 6/2001 | Chan |
| 5,802,287 | A | 9/1998 | Rostoker | 6,247,060 | B1 | 6/2001 | Boucher |
| 5,802,465 | A | 9/1998 | Hamalainen | 6,259,312 | B1 | 7/2001 | Murtojarvi |
| 5,802,576 | A | 9/1998 | Tzeng | 6,265,898 | B1 | 7/2001 | Bellaouar |
| 5,805,927 | A | 9/1998 | Bowes | 6,266,797 | B1 | 7/2001 | Godfrey |
| 5,821,809 | A | 10/1998 | Boerstler | 6,269,427 | B1 | 7/2001 | Kuttanna |
| 5,826,027 | A | 10/1998 | Pedersen | 6,279,035 | B1 | 8/2001 | Brown |
| 5,828,653 | A | 10/1998 | Goss | 6,310,501 | B1 | 10/2001 | Yamashita |
| 5,829,025 | A | 10/1998 | Mittal | 6,324,181 | B1 | 11/2001 | Wung |
| 5,831,985 | A | 11/1998 | Sandorfi | 6,332,179 | B1 | 12/2001 | Okpisz |
| 5,839,051 | A | 11/1998 | Grimmett | 6,334,153 | B2 | 12/2001 | Boucher |
| 5,844,437 | A | 12/1998 | Asazawa | 6,345,301 | B1 | 2/2002 | Burns |
| 5,848,251 | A | 12/1998 | Lomelino | 6,349,098 | B1 | 2/2002 | Parruck |
| 5,859,669 | A | 1/1999 | Prentice | 6,349,365 | B1 | 2/2002 | McBride |
| 5,861,881 | A | 1/1999 | Freeman | 6,356,944 | B1 | 3/2002 | McCarty |
| 5,875,465 | A | 2/1999 | Kilpatrick | 6,363,011 | B1 | 3/2002 | Hirose |
| 5,877,642 | A | 3/1999 | Takahashi | 6,366,583 | B2 | 4/2002 | Rowett |
| 5,887,146 | A | 3/1999 | Baxter | 6,373,846 | B1 | 4/2002 | Daniel |
| 5,887,187 | A | 3/1999 | Rostoker | 6,374,311 | B1 | 4/2002 | Mahany |
| 5,892,382 | A | 4/1999 | Ueda | 6,385,201 | B1 | 5/2002 | Iwata |
| 5,892,922 | A | 4/1999 | Lorenz | 6,389,479 | B1 | 5/2002 | Boucher |
| 5,893,150 | A | 4/1999 | Hagersten | 6,396,832 | B1 | 5/2002 | Kranzler |
| 5,893,153 | A | 4/1999 | Tzeng | 6,396,840 | B1 | 5/2002 | Rose |
| 5,903,176 | A | 5/1999 | Westgate | 6,424,194 | B1 | 7/2002 | Hairapetian |
| 5,905,386 | A | 5/1999 | Gerson | 6,424,624 | B1 | 7/2002 | Galand |
| 5,908,468 | A | 6/1999 | Hartmann | 6,427,171 | B1 | 7/2002 | Craft |
| 5,909,127 | A | 6/1999 | Pearson | 6,427,173 | B1 | 7/2002 | Boucher |
| 5,909,686 | A | 6/1999 | Muller | 6,434,620 | B1 | 8/2002 | Boucher |
| 5,914,955 | A | 6/1999 | Rostoker | 6,438,651 | B1 | 8/2002 | Slane |
| 5,937,169 | A | 8/1999 | Connery | 6,459,681 | B1 | 10/2002 | Oliva |
| 5,940,771 | A | 8/1999 | Gollnick | 6,463,092 | B1 | 10/2002 | Kim |
| 5,945,847 | A | 8/1999 | Ransijn | 6,470,029 | B1 | 10/2002 | Shimizu |
| 5,945,858 | A | 8/1999 | Sato | 6,484,224 | B1 | 11/2002 | Robins |
| 5,945,863 | A | 8/1999 | Coy | 6,496,479 | B1 | 12/2002 | Shionazaki |
| 5,961,631 | A | 10/1999 | Devereux | 6,535,518 | B1 | 3/2003 | Hu |
| 5,969,556 | A | 10/1999 | Hayakawa | 6,538,486 | B1 | 3/2003 | Chen |
| 5,974,508 | A | 10/1999 | Maheshwari | 6,564,267 | B1 | 5/2003 | Lindsay |
| 5,977,800 | A | 11/1999 | Iravani | 6,597,689 | B1 | 7/2003 | Chiu |
| 5,978,379 | A | 11/1999 | Chan | 6,606,321 | B1 | 8/2003 | Natanson |
| 5,978,849 | A | 11/1999 | Khanna | 6,614,791 | B1 | 9/2003 | Luciani |
| 5,987,507 | A | 11/1999 | Creedon | 6,614,796 | B1 | 9/2003 | Black |
| 6,002,279 | A | 12/1999 | Evans | 6,631,351 | B1 | 10/2003 | Ramachandran |
| 6,008,670 | A | 12/1999 | Pace | 6,633,936 | B1 | 10/2003 | Keller |
| 6,014,041 | A | 1/2000 | Somasekhar | 6,636,947 | B1 | 10/2003 | Neal |
| 6,014,705 | A | 1/2000 | Koenck | 6,658,599 | B1 | 12/2003 | Linam |
| 6,025,746 | A | 2/2000 | So | 6,665,759 | B2 | 12/2003 | Dawkins |
| 6,026,075 | A | 2/2000 | Linville | 6,681,283 | B1 | 1/2004 | Thekkath et al. |
| 6,028,454 | A | 2/2000 | Elmasry | 6,697,868 | B2 | 2/2004 | Craft |
| 6,037,841 | A | 3/2000 | Tanji | 6,757,291 | B1 | 6/2004 | Hu |
| 6,037,842 | A | 3/2000 | Bryan | 6,757,746 | B2 * | 6/2004 | Boucher et al. ............... 709/250 |
| 6,038,254 | A | 3/2000 | Ferraiolo | 6,765,901 | B1 | 7/2004 | Johnson |
| 6,061,351 | A | 5/2000 | Erimli | 6,766,389 | B2 | 7/2004 | Hayter |
| 6,061,747 | A | 5/2000 | Ducaroir | 6,788,686 | B1 | 9/2004 | Khotimsky |
| 6,064,626 | A | 5/2000 | Stevens | 6,788,704 | B1 | 9/2004 | Lindsay |
| 6,081,162 | A | 6/2000 | Johnson | 6,816,932 | B2 | 11/2004 | Cho |
| 6,094,074 | A | 7/2000 | Chi | 6,845,403 | B2 | 1/2005 | Chadalapaka |
| 6,098,064 | A | 8/2000 | Pirolli | 6,850,521 | B1 | 2/2005 | Kadambi |
| 6,104,214 | A | 8/2000 | Ueda | 6,859,435 | B1 | 2/2005 | Lee |
| 6,111,425 | A | 8/2000 | Bertin | 6,862,296 | B1 | 3/2005 | Desai |
| 6,111,859 | A | 8/2000 | Godfrey | 6,865,158 | B2 | 3/2005 | Iwamoto |
| 6,114,843 | A | 9/2000 | Olah | 6,874,054 | B2 | 3/2005 | Clayton |
| 6,118,776 | A | 9/2000 | Berman | 6,897,697 | B2 | 5/2005 | Yin |
| 6,122,667 | A | 9/2000 | Chung | 6,904,519 | B2 | 6/2005 | Anand |
| 6,141,705 | A | 10/2000 | Anand | 6,911,855 | B2 | 6/2005 | Yin |
| 6,151,662 | A | 11/2000 | Christie | 6,912,603 | B2 | 6/2005 | Kanazashi |
| 6,157,623 | A | 12/2000 | Kerstein | 6,927,606 | B2 | 8/2005 | Kocaman |
| 6,178,159 | B1 | 1/2001 | He | 6,937,080 | B2 | 8/2005 | Hairapetian |
| 6,185,185 | B1 | 2/2001 | Bass | 6,938,092 | B2 | 8/2005 | Burns |
| 6,188,339 | B1 | 2/2001 | Hasegawa | 6,964,008 | B1 * | 11/2005 | Van Meter, III ............... 714/807 |
| 6,194,950 | B1 | 2/2001 | Kibar | 6,971,006 | B2 | 11/2005 | Krishna |
| 6,202,125 | B1 | 3/2001 | Patterson | 6,976,205 | B1 | 12/2005 | Ziai |
| 6,202,129 | B1 | 3/2001 | Palanca | 6,982,583 | B2 | 1/2006 | Yin |
| 6,209,020 | B1 | 3/2001 | Angie | 7,007,103 | B2 | 2/2006 | Pinkerton |
| 6,215,497 | B1 | 4/2001 | Leung | 7,009,985 | B2 | 3/2006 | Black |
| 6,218,878 | B1 | 4/2001 | Ueno | 7,133,940 | B2 * | 11/2006 | Blightman et al. ............. 710/22 |
| 6,222,380 | B1 | 4/2001 | Gerowitz | 7,149,819 | B2 | 12/2006 | Petty |

| | | | |
|---|---|---|---|
| 7,167,927 B2 * | 1/2007 | Philbrick et al. | 709/250 |
| 7,181,531 B2 | 2/2007 | Pinkerton | |
| 7,185,266 B2 * | 2/2007 | Blightman et al. | 714/776 |
| 7,212,534 B2 | 5/2007 | Kadambi | |
| 7,240,098 B1 * | 7/2007 | Mansee | 709/212 |
| 7,260,631 B1 * | 8/2007 | Johnson et al. | 709/224 |
| 7,346,701 B2 * | 3/2008 | Elzur et al. | 709/232 |
| 7,349,999 B2 * | 3/2008 | Krithivas | 710/33 |
| 7,362,769 B2 | 4/2008 | Black | |
| 7,366,190 B2 | 4/2008 | Black | |
| 7,376,755 B2 | 5/2008 | Pandya | |
| 7,382,790 B2 | 6/2008 | Warren | |
| 7,385,972 B2 | 6/2008 | Black | |
| 7,397,788 B2 | 7/2008 | Mies | |
| 7,397,800 B2 | 7/2008 | Elzur | |
| 7,400,639 B2 | 7/2008 | Madukkarumukumana | |
| 7,411,959 B2 | 8/2008 | Elzur | |
| 7,430,171 B2 | 9/2008 | Black | |
| 7,472,156 B2 | 12/2008 | Philbrick | |
| 7,515,612 B1 | 4/2009 | Thompson | |
| 7,586,850 B2 | 9/2009 | Warren | |
| 7,644,188 B2 | 1/2010 | Vlodavsky | |
| 7,782,905 B2 * | 8/2010 | Keels et al. | 370/474 |
| 2001/0026553 A1 | 10/2001 | Gallant | |
| 2001/0037397 A1 | 11/2001 | Boucher | |
| 2002/0062333 A1 | 5/2002 | Anand | |
| 2002/0078265 A1 | 6/2002 | Frazier | |
| 2002/0085562 A1 | 7/2002 | Hufferd | |
| 2002/0089927 A1 | 7/2002 | Fischer | |
| 2002/0091844 A1 * | 7/2002 | Craft et al. | 709/230 |
| 2002/0095519 A1 * | 7/2002 | Philbrick et al. | 709/250 |
| 2002/0103988 A1 | 8/2002 | Dornier | |
| 2002/0120899 A1 * | 8/2002 | Gahan et al. | 714/748 |
| 2002/0130692 A1 | 9/2002 | Hairapetian | |
| 2002/0174253 A1 | 11/2002 | Hayter | |
| 2002/0190770 A1 | 12/2002 | Yin | |
| 2002/0194400 A1 | 12/2002 | Porterfield | |
| 2003/0001646 A1 | 1/2003 | Hairapetian | |
| 2003/0016628 A1 | 1/2003 | Kadambi | |
| 2003/0021229 A1 | 1/2003 | Kadambi | |
| 2003/0038809 A1 | 2/2003 | Peng | |
| 2003/0046330 A1 | 3/2003 | Hayes | |
| 2003/0046418 A1 | 3/2003 | Raval | |
| 2003/0051128 A1 | 3/2003 | Rodriguez | |
| 2003/0061505 A1 | 3/2003 | Sperry | |
| 2003/0067337 A1 | 4/2003 | Yin | |
| 2003/0079033 A1 | 4/2003 | Craft | |
| 2003/0084185 A1 | 5/2003 | Pinkerton | |
| 2003/0105977 A1 | 6/2003 | Brabson | |
| 2003/0107996 A1 | 6/2003 | Black | |
| 2003/0108050 A1 | 6/2003 | Black | |
| 2003/0108058 A1 | 6/2003 | Black | |
| 2003/0108060 A1 | 6/2003 | Black | |
| 2003/0108061 A1 | 6/2003 | Black | |
| 2003/0118040 A1 | 6/2003 | Black | |
| 2003/0140124 A1 | 7/2003 | Burns | |
| 2003/0165160 A1 * | 9/2003 | Minami et al. | 370/466 |
| 2003/0169753 A1 | 9/2003 | Black | |
| 2003/0172342 A1 | 9/2003 | Elzur | |
| 2003/0174720 A1 | 9/2003 | Black | |
| 2003/0174721 A1 | 9/2003 | Black | |
| 2003/0174722 A1 | 9/2003 | Black | |
| 2003/0198251 A1 | 10/2003 | Black | |
| 2003/0204631 A1 | 10/2003 | Pinkerton | |
| 2003/0204634 A1 | 10/2003 | Pinkerton | |
| 2004/0010545 A1 * | 1/2004 | Pandya | 709/203 |
| 2004/0019652 A1 | 1/2004 | Freimuth | |
| 2004/0037319 A1 | 2/2004 | Pandya | |
| 2004/0042458 A1 | 3/2004 | Elzu | |
| 2004/0042464 A1 | 3/2004 | Elzur | |
| 2004/0042483 A1 | 3/2004 | Elzur | |
| 2004/0042487 A1 | 3/2004 | Ossman | |
| 2004/0044798 A1 | 3/2004 | Elzur | |
| 2004/0062245 A1 | 4/2004 | Sharp | |
| 2004/0062267 A1 * | 4/2004 | Minami et al. | 370/463 |
| 2004/0062275 A1 * | 4/2004 | Siddabathuni | 370/474 |
| 2004/0081186 A1 | 4/2004 | Warren | |
| 2004/0085972 A1 | 5/2004 | Warren | |
| 2004/0085994 A1 | 5/2004 | Warren | |
| 2004/0093411 A1 | 5/2004 | Elzur | |
| 2004/0133713 A1 | 7/2004 | Elzur | |
| 2004/0143734 A1 * | 7/2004 | Buer et al. | 713/153 |
| 2004/0158793 A1 * | 8/2004 | Blightman et al. | 714/758 |
| 2004/0227544 A1 | 11/2004 | Yin | |
| 2005/0027911 A1 | 2/2005 | Hayter | |
| 2005/0160139 A1 | 7/2005 | Boucher | |
| 2005/0165980 A1 | 7/2005 | Clayton | |
| 2005/0184765 A1 | 8/2005 | Hairapetian | |
| 2005/0185654 A1 | 8/2005 | Zadikian | |
| 2005/0216597 A1 | 9/2005 | Shah | |
| 2005/0278459 A1 | 12/2005 | Boucher | |
| 2005/0286560 A1 * | 12/2005 | Colman et al. | 370/474 |
| 2006/0165115 A1 | 7/2006 | Warren | |
| 2006/0176094 A1 | 8/2006 | Hairapetian | |
| 2007/0074092 A1 * | 3/2007 | Dammann et al. | 714/763 |
| 2007/0127525 A1 * | 6/2007 | Sarangam et al. | 370/469 |
| 2007/0170966 A1 | 7/2007 | Hairapetian | |
| 2007/0171914 A1 | 7/2007 | Kadambi | |
| 2007/0237163 A1 | 10/2007 | Kadambi | |
| 2008/0025315 A1 | 1/2008 | Elzur | |
| 2008/0095182 A1 | 4/2008 | Elzur | |
| 2008/0151922 A1 | 6/2008 | Elzur | |
| 2008/0205421 A1 | 8/2008 | Black | |
| 2008/0276018 A1 | 11/2008 | Hayter | |
| 2008/0298369 A1 | 12/2008 | Elzur | |
| 2009/0074408 A1 | 3/2009 | Black | |
| 2009/0128380 A1 | 5/2009 | Hairapetian | |

FOREIGN PATENT DOCUMENTS

| | | |
|---|---|---|
| EP | 0692892 B1 | 4/2003 |
| EP | 1345382 A2 | 9/2003 |
| EP | 1357721 A2 | 10/2003 |
| EP | 1460804 A2 | 9/2004 |
| EP | 1460805 A2 | 9/2004 |
| EP | 1460806 A2 | 9/2004 |
| EP | 1206075 B1 | 11/2007 |
| EP | 1537695 B1 | 2/2009 |
| FR | 2725573 A1 | 11/1994 |
| JP | 1188301 | 7/1989 |
| JP | 6232872 | 8/1994 |
| JP | 9006691 | 1/1997 |
| WO | WO99/00948 | 1/1999 |
| WO | WO00/56013 | 9/2000 |
| WO | WO02/35784 | 5/2002 |
| WO | WO03/079612 | 9/2003 |

OTHER PUBLICATIONS

Mike Ko, Mallikarjun Chadalapaka, Uri Elzur, Hemal Shah, Patricia Thaler, John Hufferd, iSCSI Extensions for RDMA Specification, Oct. 2005.

S. Shepler, B. Callaghan, D. Robinson, R. Thurlow, C. Beame, M. Eisler, D. Noveck, Network File System (NFS) Version 4 Protocol, Apr. 2003.

Emulex Corporation's Answer, Affirmative Defenses, and Counter-claims, Demand for Jury Trial, *Broadcom Corporation* vs. *Emulex Corporation*, Case No. SACV 09-1058-JVS (ANx), Nov. 4, 2009.

Ewen, "Single-Chip 1062 Mbaud CMOS Transceiver for Serial Data communication", 1995 IEEE International Solid-State Circuits Conference, Digest of Technical Papers, First Edition, Feb. 1995, pp. 1-2, 6-13, 32-33, 336, IEEE Catalog No. 95CH35753, Publisher: John H. Wuorinen, Castine, ME 04421.

Fiedler, "A 1.0625Gbps Transceiver with 2x-Oversampling and Transmit Signal Pre-Emphasis", 1997 IEEE International Solid-State Circuits Conference, Digest of Technical Papers, ISSCC97, Session 15, Serial Data Communications, Paper FP 15.1, pp. 238-239, 464.

Fujimori, "A 90-dB SNR 2.5-MHz Output-Rate ADC Using Cascaded Multibit Delta-Sigma Modulation at 8x Oversampling Ratio", IEEE Journal of Solid-State Circuits, vol. 35, No. 12, Dec. 2000, pp. 1820-1828.

Corner, "A CMOS Phase Detector for Mixed Signal ASIC Application", IEEE, 1993, pp. 232-234.

Fiedler, "A CMOS Pulse Density Modulator for High-Resolution A/D Converters", IEEE Journal of Solid-State Circuits, vol. sc-19, No. 6, Dec. 1984, pp. 995-996.

Momtaz, "A Fully Integrated SONET OC-48 Transceiver in Standard CMOS", IEEE Journal of Solid-State Circuits, vol. 36, No. 12, Dec. 2001, pp. 1964-1973.

Schmitt, "A Low Voltage CMOS Current Source", pp. 110-113.

Hairapetian, "An 81-MHz IF Receiver in CMOS", IEEE Journal of Solid-State Circuits, vol. 31, No. 12, Dec. 1996, pp. 1981-1986.

Ang, "An Evaluation of an Attempt at Offloading TPC/IP Protocol Processing Onto an i96ORN-Based iNIC", Hewlett Packard, 2001, pp. 1-33.

Fischer, "CiNIC-Calpoly Intelligent NIC", A Thesis Presented to the Faculty of California Polytechnic State University, San Luis Obispo, Jun. 2001, pp. i-xi, 1-137.

Tanenbaum, Excerpt from Computer Networks, Third Edition, 1996, Publisher: Prentice Hall PTF, Upper Saddle River, New Jersey 07458, pp. 556-558.

Allstot, "Current-Mode Logic Techniques for CMOS Mixed-Mode ASIC's", IEEE Custom Integrated Circuits Conference, 1991, pp. 25.2.1-25.2.4.

Shivam, "EMP: Zero-copy OS-bypass NIC-Driven Gigabit Ethernet Message Passing", SC1001 Nov. 2001, Denver, CO.

Nayfeh, "Exploring the Design Space for a Shared-Cache Multiprocessor", Computer Systems Labratory, Stanford University, IEEE, 1994, pp. 166-175.

Fibre Channel Arbitration Loop (FC-AL), X3.262-199x, X3T11/ Project 960D/Rev. 4.5, working draft proposal, American National Standard for Information Technology, Jun. 1, 1995, pp. i-x, 1-92.

Fibre Channel Physical and Signaling Interface (FC-PH), X3.230-199x, X3T11 Project 755D/Rev. 4.3, working draft proposal, American National Standard for Information Systems, Jun. 1, 1994, pp. i-xxxiv, 1-338, Index.

Yeh, "Introduction to TCP/IP Offload Engine (TOA)", 10 Gigabit Ethernet Alliance, Version 1.0, Apr. 2002.

Sanchez, "Iterations in TCP/IP—Ethernet Network Optimization", a Master's thesis presented to the Faculty of California, Polytechnic State University, San Luis Obispo, Jun. 1999, pp. i-xiii, 1-156.

Allam, "Low Power CMOS Logic Families", IEEE, 1999, pp. 419-422.

Hairapetian, "Low-Temperature Mobility Measurements on CMOS Devices", IEEE Transactions on Electron Devices, vol. 36, No. 8, Aug. 1989, pp. 1448-1455.

Cao, "OC-192 Transmitter and Receiver in Standard 0.18-um CMOS", IEEE Journal of Solid-State Circuits, vol. 37, No. 12, Dec. 2002, pp. 1768-1780.

Series H: Audiovisual and Multimedia Systems, Infrastructure of Audiovisual Services—Systems and Terminal Equipment for Audiovisual Services; Visual Telephone Systems and Equipment for Local Area Networks Which Provide a Non-Guaranteed Quality of Serives, ITU-T Recommendation H.323, Superseded by a more recent version, Nov. 1996, pp. i-v, 1-71, 1.

Pinkerton, "The Case for RDMA", May 29, 2002, pp. 1-27.

Pope, "Tip of the Week: Net-Interface Accelerators Can Help or Hinder", Network Systems Design Line, Feb. 26, 2007, http://www.networksystemsdesignline.com, pp. 1-2.

Dally, "Virtual-Channel Flow Control", IEEE Transactions on Parallel and Distributed Systems, vol. 3, No. 2, Mar. 1992, pp. 194-205.

RFC 793, Transmission Control Protocol, DRPA Internet Program, Protocol Specification, Sep. 1981.

Koufopavlou, Odysseas G., and Zitterbart, Martina, Parallel TCP for High Performance Communication System, Globecom '92, IEEE Global Telecommunications Conference, Orlando, FL, Dec. 6-9, 1992, pp. 1395-1399.

MacLean, R. Andrew, and Barvick, Scott E., An Outboard Processor for High Performance Implementation of Transport Layer Protocols, IEEE Global Telecommunications Conference, Phoenix, AZ, Dec. 2-5, 1991, pp. 1728-1732.

User's Guide: Alacritech 1000x4 Quad-Port Server Adapter, Alacritech 100x2 Dual-Port Server Adapter, Alacritech 100x1 Single-Port Server Adapter (4th ed.) (900006r7f), Nov. 2000.

Alacritech 100 x 4 Quad-Port Server Adapter (Model #2000-100000)[on sale and public use by 2000].

Hardware Installation Guide: Alacritech 100x4 Quad-Port Server Adapter.

Alacritech: Company Milestones.

Alacritech Press Release: Alacritech Ships Industry's First Gigabit Ethernet Accelerator, Oct. 22, 2001.

Raut, Abhay, Verification of a Transport Offload Engine, Dec. 2002.

Gallatin, Andrew, Chase, Jeff, and Yocum, Ken, Trapeze/IP: TCP/IP at Near-Gigabit Speeds, Proceedings of the FREENIX Track: 1999 USENIX Annual Technical Conference, Monterey, CA, Jun. 6-11, 1999.

Buonadonna, Phil, and Culler, David, Queue-Pair IP: A Hybrid Architecture for System Area Networks, Copyright 2002 Intel Corporation, IRB-TR-02-002, Mar. 2002.

Kaiserswerth, Matthias, The Parallel Protocol Engine, IBM Research Division, Zurich Research Laboratory, Switzerland, undated.

Xiao, Xipeng and Lionel, M.Ni, Parallel Routing Table Computation for Scalable IP Routers, undated.

Dunkels, Adam, Minimal TCP/IP Implementation with Proxy Support, SICS Technical Report, ISSN 1100-3154, ISRN: SICS-T-2001/20-SE, Feb. 2001.

Sarkar, Prasenjit and Voruganti, Kaladhar, IP Storage: The Challenge Ahead, IBM Almaden Research Center, San Jose, CA, undated.

Chase, Jeffrey S., Gallatin, Andrew J., and Yocum, Kenneth G., End-System Optimizations for High-Speed TCP, Duke University, Durham, NC, undated.

Wright & Stevens, TCP/IP Illustrated, vol. 2: The Implementation, Corporate Professional Publishing Group, Reading MA 01867, ISBN 0-201-63354-X, 1995, pp. 803-805.

Wright & Stevens, TCP/IP Illustrated, vol. 2: The Implementation, Corporate Professional Publishing Group, Reading MA 01867, ISBN 0-201-63354-X, 1995, pp. 817-818.

Wright & Stevens, TCP/IP Illustrated, vol. 2: The Implementation, Corporate Professional Publishing Group, Reading MA 01867, ISBN 0-201-63354-X, 1995, pp. 790-840.

Ang, An Evaluation of an Attempt at Offloading TCP/IP Protocol Processing Onto an i960RN-based iNIC, Hewlett Packard, Jan. 9, 2001.

Defendant Emulex Corporation's Disclosure of Preliminary Invalidity Contentions, with Exhibit F, *Broadcom Corporation* vs. *Emulex Corporation*, Case No. SACV 09-1058-JVS (ANx), Jun. 28, 2010.

Defendant Emulex Corporation's First Amendment Disclosure of Preliminary Invalidity Contentions, with Exhibit E, *Broadcom Corporation* vs. *Emulex Corporation*, Case No. SACV 09-1058-JVS (ANx), Aug. 30, 2010.

User's Guide: Alacritech 100x4 Quad-Port Server Adapter and Alacritech 100x2 Dual-Port Server Adapter, (Bates Nos. ELX-PAT-00045223-ELX-PAT-00045268).

Broadcom Corporation's [Proposed] Final Disclosure of Asserted Claims and Infringement Contentions, United States District Court, Central District of California, Southern Division, *Broadcom Corporation* v. *Emulex Corporation,* Case No. SACV09-1058 JVS (ANx), SACV10-03963-Jvs (ANx), dated Feb. 4, 2011.

* cited by examiner

METHOD AND SYSTEM FOR SUPPORTING READ OPERATIONS WITH CRC FOR ISCSI AND ISCSI CHIMNEY

CROSS-REFERENCE TO RELATED APPLICATIONS/INCORPORATION BY REFERENCE

The present application is a continuation-in-part of application No. 10/652,267 filed on Aug. 29, 2003 now U.S. Pat. No. 7,346,701, which makes reference to, claims priority to and claims benefit from U.S. Provisional Patent Application Ser. No. 60/408,617 filed on Sep. 6, 2002, U.S. Provisional Patent Application Ser. No. 60/407,165 filed on Aug. 30, 2002, U.S. Provisional Patent Application Ser. No. 60/456,260 filed on Mar. 20, 2003 and U.S. Provisional Patent Application Ser. No. 60/456,265 filed on Mar. 20, 2003.

This application also makes reference to, claims priority to, and claims the benefit of:

U.S. Provisional Patent Application Ser. No. 60/580,977 filed Jun. 17, 2004; and
U.S. Provisional Patent Application Ser. No. 60/660,750 filed Mar. 11, 2005.

The following application makes reference to:

U.S. patent application Ser. No. 11/156,289 filed Jun. 17, 2005;
U.S. patent application Ser. No. 11/156,182 filed Jun. 17, 2005;
U.S. patent application Ser. No. 11/156,182 filed Jun. 17, 2005; and
U.S. patent application Ser. No. 11/155,966 filed Jun. 17, 2005.

Each of the above stated applications is hereby incorporated herein by reference in its entirety.

FIELD OF THE INVENTION

Certain embodiments of the invention relate to networking systems, methods and architectures. More specifically, certain embodiments of the invention relate to a method and system for supporting iSCSI read operations with a cyclic redundancy check (CRC) and iSCSI chimney.

BACKGROUND OF THE INVENTION

Innovations in data communications technology, fueled by bandwidth-intensive applications, have led to a ten-fold improvement in networking hardware throughput occurring about every four years. These network performance improvements, which have increased from 10 Megabits per second (Mbps) to 100 Mbps, and now to 1-Gigabit per second (Gbps) with 10-Gigabit on the horizon, have outpaced the capability of central processing units (CPUs). To compensate for this dilemma and to free up CPU resources to handle general computing tasks, offloading Transmission Control Protocol/Internet Protocol (TCP/IP) functionality to dedicated network processing hardware is a fundamental improvement. TCP/IP chimney offload maximizes utilization of host CPU resources for application workloads, for example, on Gigabit and multi-Gigabit networks.

TCP/IP chimney offload provides a holistic technique for segmenting TCP/IP processing into tasks that may be handled by dedicated network processing controller hardware and an operating system (OS). TCP/IP chimney offload redirects most of the TCP/IP related tasks to a network controller for processing, which frees up networking-related CPU resources overhead. This boosts overall system performance, and eliminates and/or reduces system bottlenecks. Additionally, TCP/IP chimney offload technology will play a key role in the scalability of servers, thereby enabling next-generation servers to meet the performance criteria of today's high-speed networks such as Gigabit Ethernet (GbE) networks.

Although TCP/IP offload is not a new technology, conventional TCP/IP offload applications have been platform specific and were not seamlessly integrated with the operating system's networking stack. As a result, these conventional offload applications were standalone applications, which were platform dependent and this severely affected deployment. Furthermore, the lack of integration within an operating system's stack resulted in two or more independent and different TCP/IP implementations running on a single server, which made such systems more complex to manage.

TCP/IP chimney offload may be implemented using a PC-based or server-based platform, an associated operating system (OS) and a TCP offload engine (TOE) network interface card (NIC). The TCP stack is embedded in the operating system of a host system. The combination of hardware offload for performance and host stack for controlling connections, results in the best OS performance while maintaining the flexibility and manageability of a standardized OS TCP stack. TCP/IP chimney offload significantly boosts application performance due to reduced CPU utilization. Since TCP/IP chimney offload architecture segments TCP/IP processing tasks between TOE's and an operating system's networking stack, all network traffic may be accelerated through a single TCP/IP chimney offload compliant adapter, which may be managed using existing standardized methodologies. Traditional TCP offload as well as TCP chimney offload are utilized for wired and wireless communication applications.

Internet Small Computer System Interface (iSCSI) is a TCP/IP-based protocol that is utilized for establishing and managing connections between IP-based storage devices, hosts and clients. The iSCSI protocol describes a transport protocol for SCSI, which operates on top of TCP and provides a mechanism for encapsulating SCSI commands in an IP infrastructure. The iSCSI protocol is utilized for data storage systems utilizing TCP/IP infrastructure.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for supporting iSCSI read operations with a cyclic redundancy check (CRC) and iSCSI chimney, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for performing SCSI read operations with a cyclic redundancy check via a TCP offload engine. Aspects of the method may comprise receiving an iSCSI read command from an initiator. Data may be fetched from a buffer based on the received iSCSI read command. The fetched data may be zero copied from the buffer to the initiator and a TCP sequence may be retransmitted to the initiator. A digest value may be calculated, which may be communicated to the initiator. An accumulated digest value stored in a temporary buffer may be utilized to calculate a final digest value, if the buffer is posted. The retransmitted TCP sequence may be processed and the fetched data may be zero copied into an iSCSI buffer, if the buffer is posted. The calculated final digest value may be communicated to the initiator. This is also applicable to an iSCSI target device employing an enhanced TCP offload engine adapted to process iSCSI data. The target may be located in the peer of an initiator and the iSCSI terminology used herein may be expressed from an initiator's view. For example, a read command may be issued from the initiator and goes to the target. The target may send the data to the initiator in a protocol data unit, for example a DataIn PDU. When the transaction is complete, the target may send an iSCSI status PDU.

Figure 1:
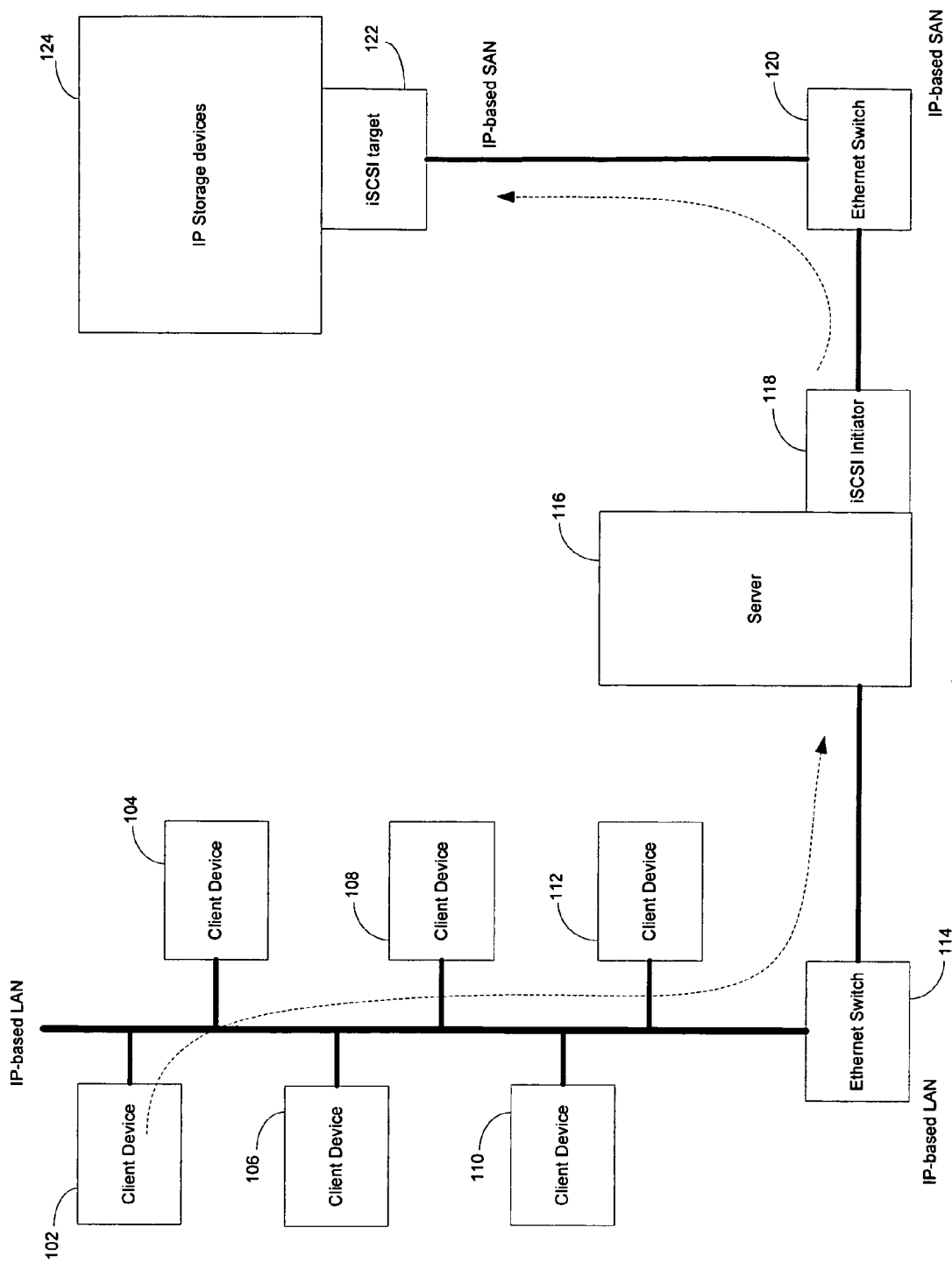
FIG. 1 is a block diagram of an exemplary system illustrating an iSCSI storage area network principle of operation that may be utilized in connection with an embodiment of the invention.

FIG. 1 is a block diagram of an exemplary system illustrating an iSCSI storage area network principle of operation that may be utilized in connection with an embodiment of the invention. Referring to FIG. 1, there is shown a plurality of client devices 102, 104, 106, 108, 110 and 112, a plurality of Ethernet switches 114 and 120, a server 116, an iSCSI initiator 118, an iSCSI target 122 and a storage device 124.

The plurality of client devices 102, 104, 106, 108, 110 and 112 may comprise suitable logic, circuitry and/or code that may be adapted to a specific service from the server 116 and may be a part of a corporate traditional data-processing IP-based LAN, for example, to which the server 116 is coupled. The server 116 may comprise suitable logic and/or circuitry that may be coupled to an IP-based storage area network (SAN) to which IP storage device 124 may be coupled. The server 116 may process the request from a client device that may require access to specific file information from the IP storage devices 124. The Ethernet switch 114 may comprise suitable logic and/or circuitry that may be coupled to the IP-based LAN and the server 116. The iSCSI initiator 118 may comprise suitable logic and/or circuitry that may be adapted to receive specific SCSI commands from the server 116 and encapsulate these SCSI commands inside a TCP/IP packet(s) that may be embedded into Ethernet frames and sent to the IP storage device 124 over a switched or routed SAN storage network. The Ethernet switch 120 may comprise suitable logic and/or circuitry that may be coupled to the IP-based SAN and the server 116. The iSCSI target 122 may comprise suitable logic, circuitry and/or code that may be adapted to receive an Ethernet frame, strip at least a portion of the frame, and recover the TCP/IP content. The iSCSI target may also be adapted to decapsulate the TCP/IP content, obtain SCSI commands needed to retrieve the required information and forward the SCSI commands to the IP storage device 124. The IP storage device 124 may comprise a plurality of storage devices, for example, disk arrays or a tape library.

The iSCSI protocol is one that enables SCSI commands to be encapsulated inside TCP/IP session packets, which may be embedded into Ethernet frames for subsequent transmissions. The process may start with a request from a client device, for example, client device 102 over the LAN to the server 116 for a piece of information. The server 116 may be adapted to retrieve the necessary information to satisfy the client request from a specific storage device on the SAN. The server 116 may then issue specific SCSI commands needed to satisfy the client device 102 and may pass the commands to the locally attached iSCSI initiator 118. The iSCSI initiator 118 may encapsulate these SCSI commands inside a TCP/IP packet(s) that may be embedded into Ethernet frames and sent to the storage device 124 over a switched or routed storage network.

The iSCSI target 122 may also be adapted to decapsulate the packet, and obtain the SCSI commands needed to retrieve the required information. The process may be reversed and the retrieved information may be encapsulated into TCP/IP segment form. This information may be embedded into one or more Ethernet frames and sent back to the iSCSI initiator 118 at the server 116, where it may be decapsulated and returned as data for the SCSI command that was issued by the server 116. The server may then complete the request and place the response into the IP frames for subsequent transmission over a LAN to the requesting client device 102.

Figure 2A:
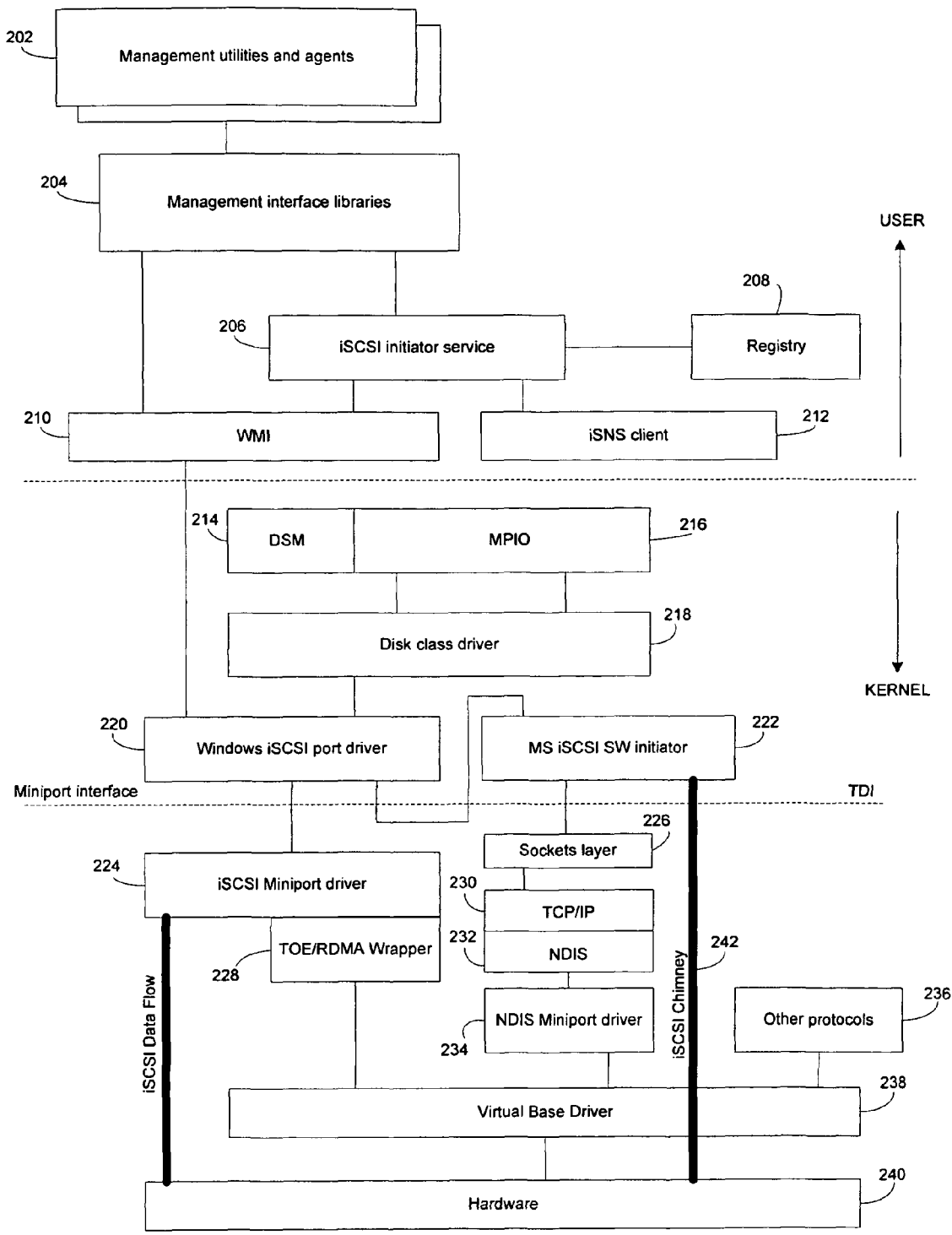
FIG. 2a is a block diagram illustrating the iSCSI software architecture in an iSCSI initiator application, in accordance with an embodiment of the invention.

FIG. 2a is a block diagram illustrating the iSCSI software architecture in an iSCSI initiator application, in accordance with an embodiment of the invention. The elements shown in FIG. 2a may be within the server 116 and the iSCSI initiator 118 of FIG. 1. Referring to FIG. 2a, there is shown a management utilities and agents block 202, a management interface libraries block 204, an iSCSI initiator service block 206, a registry block 208, a Windows Management Instrumentation (WMI) block 210, an Internet Storage Name Service (iSNS) client block 212, a device specific module (DSM) block 214, a multi-path input output (MPIO) block 216, a disk class driver block 218, a Windows iSCSI port driver block 220, an iSCSI software initiator block 222, a sockets layer block 226, a TCP/IP block 230, a network driver interface specification (NDIS) block 232, a NDIS miniport driver block 234, an iSCSI miniport driver block 224, a TCP offload engine (TOE)/remote direct memory access (RDMA) wrapper block 228, an other protocols block 236, a virtual bus driver block 238, a hardware block 240 and an iSCSI chimney 242. This diagram may be applicable to a target using the Microsoft Windows operating system, for example. For a target that utilizes another operating system, the hardware 240, the TCP/IP 230 and the iSCSI target entity may replace the Microsoft iSCSI SW initiator 222.

The management utilities and agents block 202 may comprise suitable logic, circuitry and/or code that may be adapted to configure device management and control panel applications. The management interface libraries block 204 may comprise suitable logic, circuitry and/or code that may be adapted to manage and configure various interface libraries in the operating system. The management interface libraries block 204 may be coupled to the management utilities and agents block 202, the iSCSI initiator service block 206 and the Windows Management Instrumentation (WMI) block 210. The iSCSI initiator service block 206 may be adapted to manage a plurality of iSCSI initiators, for example, network adapters and host bus adapters on behalf of the operating system.

The iSCSI initiator service block 206 may be adapted to aggregate discovery information and manage security. The iSCSI initiator service block 206 may be coupled to the management interface libraries block 204, the registry block 208, the iSNS client block 212 and the Windows Management Instrumentation (WMI) block 210. The registry block 208 may comprise a central hierarchical database that may utilized by an operating system, for example, Microsoft Windows 9x, Windows CE, Windows NT, and Windows 2000 to store information necessary to configure the system for one or more users, applications and hardware devices. The registry block 208 may comprise information that the operating system may reference during operation, such as profiles for each user, the applications installed on the computer and the types of documents that each may create, property sheet settings for folders and application icons, what hardware exists on the system, and the ports that are being used.

The Windows Management Instrumentation (WMI) block 210 may be adapted to organize individual data items properties into data blocks or structures that may comprise related information. Data blocks may have one or more data items. Each data item may have a unique index within the data block, and each data block may be named by a globally unique 128-bit number, for example, called a globally unique identifier (GUID). The WMI block 210 may be adapted to provide notifications to a data producer as to when to start and stop collecting the data items that compose a data block. The Windows Management Instrumentation (WMI) block 210 may be further coupled to the Windows iSCSI port driver block 220.

The Internet Storage Name Service (iSNS) client block 212 may comprise suitable logic, circuitry and/or code that may be adapted to provide both naming and resource discovery services for storage devices on an IP network. The iSNS client block 212 may be adapted to build upon both IP and Fiber Channel technologies. The iSNS protocol may use an iSNS server as the central location for tracking information about targets and initiators. The iSNS server may run on any host, target, or initiator on the network. The iSNS client software may be required in each host initiator or storage target device to enable communication with the server. In an initiator, the iSNS client block 212 may register the initiator and query the list of targets. In a target, the iSNS client block 212 may register the target with the server.

The multi-path input output MPIO block 216 may comprise generic code for vendors to adapt to their specific hardware device so that the operating system may provide the logic necessary for multi-path I/O for redundancy in case of a loss of a connection to a storage target. The device specific module DSM block 214 may play a role in a number of critical events, for example, device-specific initialization, request handling, and error recovery. During device initialization, each DSM block 214 may be contacted in turn to determine whether or not it may provide support for a specific device. If the DSM block 214 supports the device, it may then indicate whether the device is a new installation, or a previously installed device which is now visible through a new path. During request handling, when an application makes an I/O request to a specific device, the DSM block 214 may determine based on its internal load balancing algorithms, a path through which the request should be sent. If an I/O request cannot be sent down a path because the path is broken, the DSM block 214 may be capable of shifting to an error handling mode, for example. During error handling, the DSM block 214 may determine whether to retry the input/output (I/O) request, or to treat the error as fatal, making fail-over necessary, for example. In the case of fatal errors, paths may be invalidated, and the request may be rebuilt and transmitted through a different device path.

The disk class driver block 218 may comprise suitable logic, circuitry and/or code that may be adapted to receive application requests and convert them to SCSI commands, which may be transported in command description blocks (CDBs). The disk class driver block 218 may be coupled to the DSM block 214, the MPIO block 216, the Windows iSCSI port driver block 220 and the iSCSI software initiator block 222. In an operating system, for example, Windows, there might be at least two paths where the networking stack may be utilized. For example, an iSCSI software initiator block 222 may be adapted to support an iSCSI chimney 242 by allowing direct exchange of iSCSI CDBs, buffer information and data to and from the hardware 240 without further copying of the data. The second path may be to utilize an iSCSI miniport driver 224. The iSCSI miniport driver 224 may interface with the hardware 240 in the same fashion as described above for the iSCSI software initiator block 222. The use of a potential iSCSI chimney 242 from the hardware 240 to the iSCSI software initiator block 222 eliminates data copy and computing overhead from the iSCSI path but also allows the operating system to use one TCP stack for networking and storage providing a more robust solution as compared to using a third party TCP stack in the iSCSI storage stack. The TCP stack embedded in the TOE/RDMA wrapper 228 may be exposed to denial of service attacks and may be maintained. The interface between iSCSI software initiator block 222 and the hardware 240 may also be adjusted to support iSCSI over RDMA known as iSCSI extensions for RDMA (iSER). The second path may provide support for iSCSI boot, which is supported over the storage stack. The iSCSI boot capability may allow the initiator to boot from a disk attached to the system, for example, the server 116 (FIG. 1) over a network, and iSCSI to communicate with the disk. However for other operating systems the iSCSI chimney 242 may support both handling iSCSI data and control as well as iSCSI boot services over the networking stack and/or over the storage stack.

The Windows iSCSI port driver block 220 may comprise a plurality of port drivers that may be adapted to manage different types of transport, depending on the type of adapter, for example, USB, SCSI, iSCSI or Fiber Channel (FC) in use. The iSCSI software initiator block 222 may be adapted to function with the network stack, for example, iSCSI over TCP/IP and may support both standard Ethernet network adapters and TCP/IP offloaded network adapters, and may also be adapted to supporting an iSCSI chimney 242. The iSCSI software initiator block 222 may also support the use of accelerated network adapters to offload TCP overhead from a host processor to the network adapter. The iSCSI miniport driver block 224 may comprise a plurality of associate device drivers known as miniport drivers. The miniport driver may be adapted to implement routines necessary to interface with the storage adapter's hardware. A miniport driver may combine with a port driver to implement a complete layer in the storage stack. The miniport interface or the transport driver interface (TDI) may describe a set of functions through which transport drivers and TDI clients may communicate and the call mechanisms used for accessing them.

The iSCSI software initiator block 222 or any other software entity that manages and owns the iSCSI state or a similar entity for other operating systems may comprise suitable logic, circuitry and/or code that may be adapted to receive data from the Windows iSCSI port driver 220 and offload it to the hardware block 240 via the iSCSI chimney 242. On a target, the iSCSI software target block may also support the use of accelerated network adapters to offload TCP overhead from a host processor to a network adapter. The iSCSI software target block may also be adapted to use the iSCSI chimney 242.

The sockets layer 226 may be used by the TCP chimney and by any consumer that may need sockets services. The sockets layer 226 may be adapted to interface with the hardware 240 capable of supporting TCP chimney. For non-offloaded TCP communication, the TCP/IP block 230 may utilize transmission control protocol/internet protocol that may be adapted to provide communication across interconnected networks. The network driver interface specification NDIS block 232 may comprise a device-driver specification that may be adapted to provide hardware and protocol independence for network drivers and offer protocol multiplexing so that multiple protocol stacks may coexist on the same host. The NDIS miniport driver block 234 may comprise routines that may be utilized to interface with the storage adapter's hardware and may be coupled to the NDIS block 232 and the virtual bus driver (VBD) block 238. The VBD 238 may be required in order to simplify the hardware 240 system interface and internal handling of requests from multiple stacks on the host, however use of VBD 238 may be optional with the iSCSI chimney 242.

The iSCSI chimney 242 may comprise a plurality of control structures that may describe the flow of data between the iSCSI software initiator block 222 or the iSCSI miniport driver 224 and the hardware block 240 in order to enable a distributed and more efficient implementation of the iSCSI layer. The TOE/RDMA block 228 may comprise suitable logic, circuitry and/or code that may be adapted to implement remote direct memory access that may allow data to be transmitted from the memory of one computer to the memory of another computer without passing through either device's central processing unit (CPU). In this regard, extensive buffering and excessive calls to an operating system kernel may not be necessary. The TOE/RDMA block 228 may be coupled to the virtual bus driver block 238 and the iSCSI miniport driver block 224. Specifically to iSCSI, it may be adapted to natively support iSER, or NFS over RDMA or other transports relying on RDMA services. These RDMA services may also be supported on a target.

The virtual bus driver block 238 may comprise a plurality of drivers that facilitate the transfer of data between the iSCSI software initiator block 222 and the hardware block 240 via the iSCSI chimney 242. The virtual bus driver block 238 may be coupled to the TOE/RDMA block 228, NDIS miniport driver block 234, the sockets layer block 226, the other protocols block 236 and the hardware block 240. The other protocols block 236 may comprise suitable logic, circuitry and/or code that may be adapted to implement various protocols, for example, the Fiber Channel Protocol (FCP) or the SCSI-3 protocol standard to implement serial SCSI over Fiber Channel networks. The hardware block 240 may comprise suitable logic and/or circuitry that may be adapted to process received data from the drivers, the network interface and other devices coupled to the hardware block 240.

The iSCSI initiator 118 [FIG. 1] and iSCSI target 122 devices on a network may be named with a unique identifier and assigned an address for access. The iSCSI initiators 118 and iSCSI target nodes 122 may either use an iSCSI qualified name (IQN) or an enterprise unique identifier (EUI). Both types of identifiers may confer names that may be permanent and globally unique. Each node may have an address comprised of the IP address, the TCP port number, and either the IQN or EUI name. The IP address may be assigned by utilizing the same methods commonly employed on networks, such as dynamic host control protocol (DHCP) or manual configuration. During discovery phase, the iSCSI software initiator 222 or the iSCSI miniport driver 224 may be able to determine or accept it for the management layers WMI 210, iSCSI initiator services 206, management interface libraries 204 and management utilities and agents 202 for both the storage resources available on a network, and whether or not access to that storage is permitted. For example, the address of a target portal may be manually configured and the initiator may establish a discovery session. The target device may respond by sending a complete list of additional targets that may be available to the initiator.

The Internet Storage Name Service (iSNS) is a device discovery protocol that may provide both naming and resource discovery services for storage devices on the IP network and builds upon both IP and Fibre Channel technologies. The protocol may utilize an iSNS server as a central location for tracking information about targets and initiators. The server may be adapted to run on any host, target, or initiator on the network. The iSNS client software may be required in each host initiator or storage target device to enable communication with the server. In the initiator, the iSNS client may register the initiator and may query the list of targets. In the target, the iSNS client may register the target with the server.

For the initiator to transmit information to the target, the initiator may first establish a session with the target through an iSCSI logon process. This process may start the TCP/IP connection, and verify that the initiator has access rights to the target through authentication. The initiator may authorize the target as well. The process may also allow negotiation of various parameters including the type of security protocol to be used, and the maximum data packet size. If the logon is successful, an ID may be assigned to both the initiator and the target. For example, an initiator session ID (ISID) may be assigned to the initiator and a target session ID (TSID) may be assigned to the target. Multiple TCP connections may be established between each initiator target pair, allowing more transactions during a session or redundancy and fail over in case one of the connections fails.

Figure 2B:
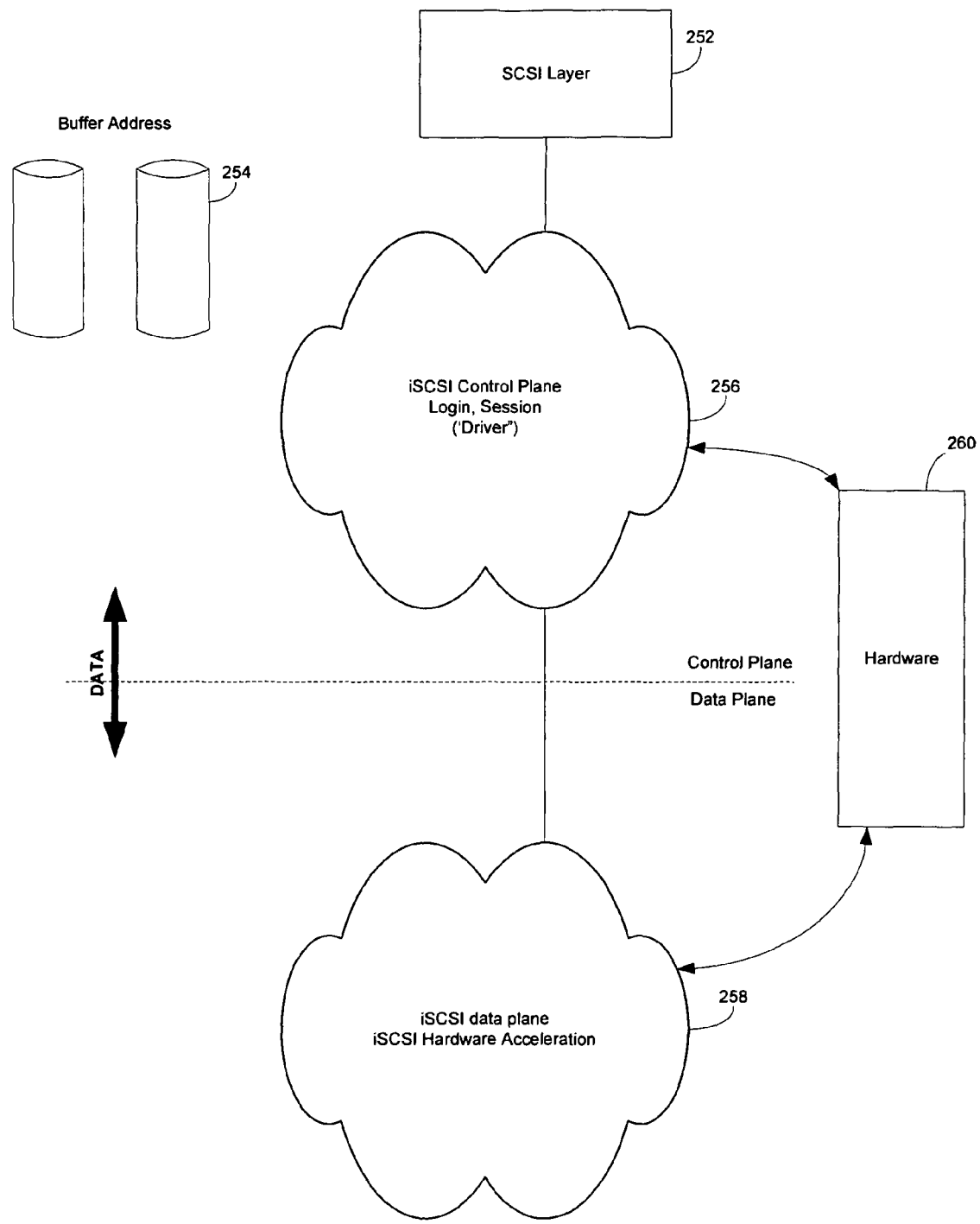
FIG. 2b is a block diagram illustrating the flow of data between the control plane and the data plane in the iSCSI architecture, in accordance with an embodiment of the invention.

FIG. 2b is a block diagram illustrating the flow of data between the control plane and the data plane in the iSCSI architecture, in accordance with an embodiment of the invention. Referring to FIG. 2b, there is shown a SCSI layer block 252, a set of buffer addresses 254, each pointing to data storage buffers, an iSCSI control plane block 256, which performs the control plane processing and the iSCSI data plane block 258, which performs the data plane processing and the hardware block 260. Both the control plane 256 and the data plane 258 may have connections to the hardware block 260 to allow communications to the IP network. The SCSI layer block 252 may comprise a plurality of functional blocks, for example, a disk class driver block 218 (FIG. 2*a*) and the iSCSI software initiator block 222 that may be adapted to support the use of various SCSI storage solutions, including SCSI HBA, Fiber Channel HBA, iSCSI HBA, and accelerated network adapters to offload TCP and iSCSI overhead from a host processor to the network adapter. The buffer address block 254 may comprise a plurality of points to buffers that may be adapted to store data delivered to or received from the driver. The iSCSI control plane block 256 may comprise suitable logic, circuitry and/or code that may be adapted to provide streamlined storage management. The control plane utilizes a simple network connection to handle login, and session management. These operations may not be considered to be time critical. A large amount of state may be required for logic and session management. When the SCSI layer 252 requires a high performance operation such as read or write, the control plane may assign an ITT to the operation and pass the request to the data plane. The control plane may handle simple overhead operations required for the command such as timeouts.

During the discovery phase, the iSCSI initiators 222 (FIG. 2*a*) may have the capability to determine both the storage resources available on a network, and whether or not access to that storage is permitted. For example, the address of a target portal may be manually configured and the initiator may establish a discovery session. The target device may respond by sending a complete list of additional targets that may be available to the initiator. The Internet Storage Name Service (iSNS) protocol may utilize an iSNS server as a central location for tracking information about targets and initiators. The server may be adapted to run on any host, target, or initiator on the network.

The iSNS client software may be required in each host initiator or storage target device to enable communication with the server. In the initiator, the iSNS client may register the initiator and may query the list of targets. In the target, the iSNS client may register the target with the server. For the initiator to transmit information to the target, the initiator may first establish a session with the target through an iSCSI logon process. This process may start the TCP/IP connection, verify that the initiator has access to the target (authentication), and allow negotiation of various parameters including the type of security protocol to be used, and the maximum data packet size. If the logon is successful, an ID such as an initiator session ID (ISID) may be assigned to initiate and an ID such as a target session ID (TSID) may be assigned to the target.

The iSCSI data plane block 258 may comprise suitable logic, circuitry and/or code that may be adapted to process performance oriented transmitted and received data from the drivers and other devices to/from the hardware block 260. The control plane may be adapted to pass a CDB to the data plane. The CDB may comprise the command, for example, a read or write of specific location on a specific target, buffer pointers, and an initiator transfer tag (ITT) value unique to the CDB. When the data plane 258 has completed the operation, it may return a status to the control plane 256 indicating if the operation was successful or not.

Figure 3:
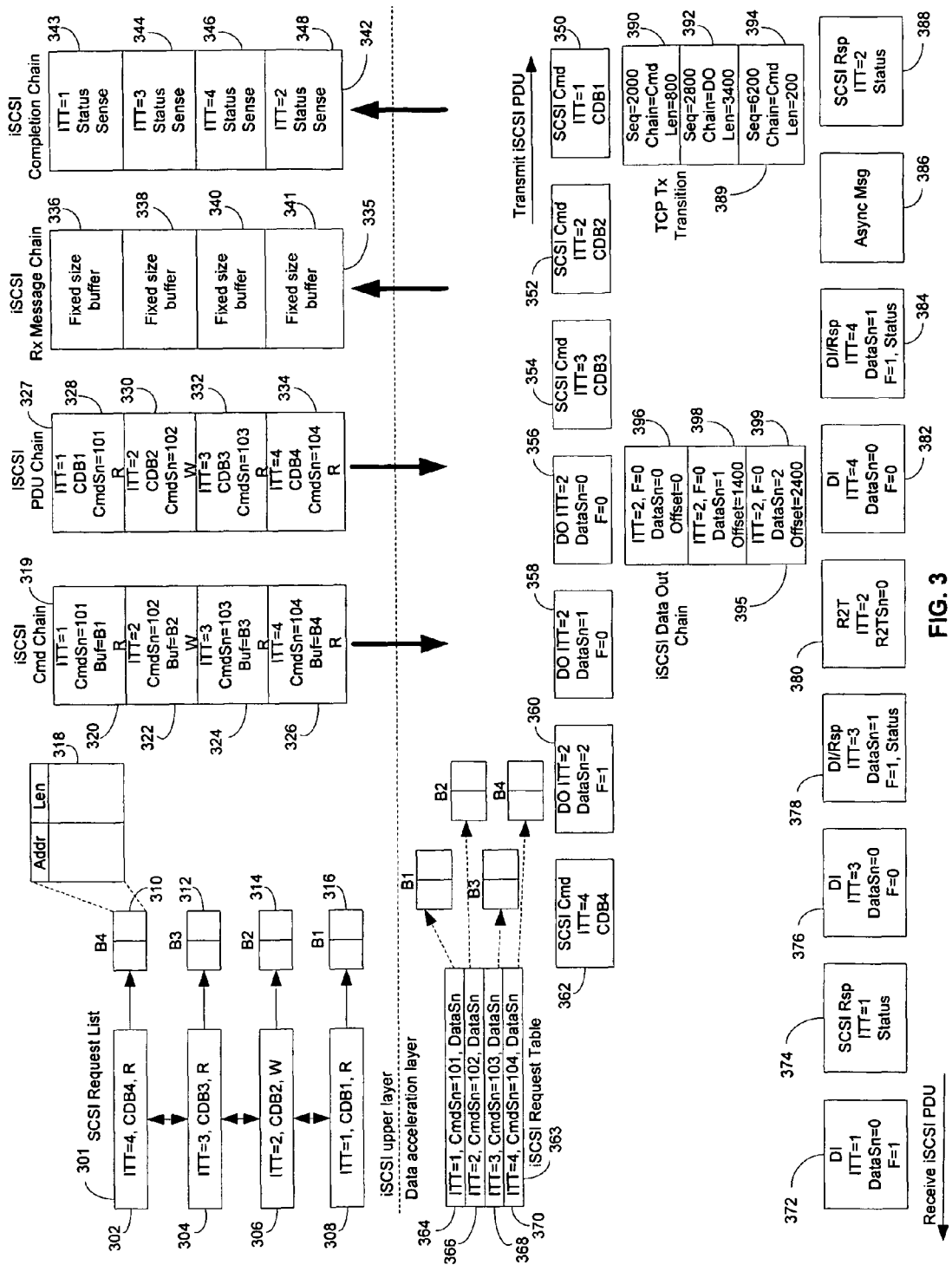
FIG. 3 is a block diagram of an exemplary iSCSI chimney, in accordance with an embodiment of the invention.

FIG. 3 is a block diagram of an exemplary iSCSI chimney, in accordance with an embodiment of the invention. Referring to FIG. 3, there is shown, a SCSI request list 301, a set of buffers B1 316, B2 314, B3 312 and B4 310, each buffer, for example, B4 310 may have a list of physical buffer addresses and lengths associated with it, a iSCSI command chain 319, an iSCSI PDU chain 327, an iSCSI Rx message chain 335 an iSCSI completion chain 342 in the iSCSI upper layer representing state maintained by a software driver or on HBA. Also shown in FIG. 3 is the state maintained by the hardware that comprises an iSCSI request table 363, a set of SCSI command blocks 350, 352, 354 and 362, a set of data out blocks 356, 358 and 360, a TCP transition table 389, an iSCSI data out chain 395, a set of data in blocks 372, 376, 378, 382, 384, a set of status indicator blocks 374 and 388, a request to transmit (R2T) block 380 and an asynchronous message block 386 in the data acceleration layer.

The SCSI request list 301 may comprise a set of command descriptor blocks (CDBs) 302, 304, 306 and 308. The iSCSI command chain 319 may comprise a set of command sequence blocks 320, 322, 324 and 326. The iSCSI PDU chain 327 may comprise a set of CDBs 328, 330, 332 and 334. The iSCSI message chain 335 may comprise a set of fixed size buffers 336, 338, 340 and 341. The iSCSI completion chain 342 may comprise a set of status blocks 343, 344, 346 and 348. The iSCSI request table 363 may comprise a set of command sequence blocks 364, 366, 368 and 370. The TCP transition table 389 may comprise a set of sequence blocks 390, 392 and 394 and the iSCSI data out chain 395 may comprise a set of data out blocks 396, 398 and 399.

The command descriptor block (CDB) 302 has an initiator task tag (ITT) value 4, corresponding to CDB4 and performs a read operation, for example. The CDB 304 has an ITT value 3, corresponding to CDB3 and performs a read operation, for example. The CDB 306 has an ITT value 2, corresponding to CDB2 and performs a write operation, for example and the CDB 308 has an ITT value 1, corresponding to CDB1 and performs a read operation, for example. Each of the CDBs 302, 304, 306 and 308 may be mapped to a corresponding buffer B4 310, B3 312, B2 314 and B1 316 respectively. Each of the buffers B4 310, B3 312, B2 314 and B1 316 may be represented as shown in block 318 with an address of a data sequence to be stored and its corresponding length. The ITT value may be managed by the data acceleration layer. Before an iSCSI upper layer submits a request, it requests the data acceleration layer for the ITT value. The ITT value may be allocated from the iSCSI request table 363 by the iSCSI upper layer to uniquely identify the command. The ITT value may be chosen such that when a corresponding iSCSI PDU, for example, an iSCSI data length (DataIn) PDU or an iSCSI R2T PDU arrive, the data acceleration layer may readily identify the entry inside the iSCSI request table using the ITT or a portion of the ITT.

The iSCSI command chain 319 may comprise a set of exemplary command sequence blocks (CSBs) 320, 322, 324 and 326. The CSB 320 has associated ITT value 1, command sequence (CmdSn) value 101, buffer B1 316 and is a read operation, for example. The CSB 322 has associated ITT value 2, CmdSn value 102, buffer B2 314 and is a write operation, for example. The CSB 324 has associated ITT value 3, CmdSn value 103, buffer B3 312 and is a read operation, for example. The CSB 324 has associated ITT value 4, CmdSn value 104, buffer B4 310 and a read operation, for example. The iSCSI PDU chain 327 may comprise a set of exemplary CDBs 328, 330, 332 and 334. The CDB 328 has associated ITT value 1, CmdSn value 101 and read operation, for example. The CDB 330 has associated ITT value 2, CmdSn value 102 and write operation, for example. The CDB 332 has associated ITT value 3, CmdSn value 103 and read operation, for example. The CDB 334 has associated ITT value 4, CmdSn value 104 and is a read operation, for example. The iSCSI message chain 335 may comprise a set of exemplary fixed size buffers 336, 338, 340 and 341 corresponding to each of the CDBs 320, 322, 324 and 326 respectively. The iSCSI completion chain 342 may comprise a set of status blocks 343, 344, 346 and 348 and may have corresponding ITT value 1, ITT value 3, ITT value 4 and ITT value 2 respectively, for example.

The iSCSI request table 363 may comprise a set of command sequence blocks 364, 366, 368 and 370. The CSB 364 has associated ITT value 1, CmdSn value 101, data sequence (DataSn) and buffer B1, for example. The CSB 366 may have associated ITT value 2, CmdSn value 102, data sequence (DataSn) and buffer B2, for example. The CSB 368 may have associated ITT value 3, CmdSn value 103, data sequence (DataSn) and buffer B3, for example. The CSB 370 may have associated ITT value 4, CmdSn value 104, data sequence (DataSn) and buffer B4, for example. By arranging the commands in the iSCSI request table 363, a portion of the ITT may be chosen as the index to the entry inside the iSCSI request table 363. When a command is completed, the corresponding iSCSI request table entry may be marked as completed without re-arranging other commands. The CDBs 320, 322, 324 and 326 may be completed in any order. Once the iSCSI request table entry is marked completed, the data acceleration layer may stop any further data placement into the buffer.

Notwithstanding, in another embodiment of the invention, when the iSCSI request table 363 is full, the iSCSI upper layer may still be able to send commands by building at the iSCSI upper layer. The iSCSI request table 363 may not need to be sized beforehand and the iSCSI chimney 242 may continue to work even if the number of command requests exceeds the capability of the data acceleration layer or the size of iSCSI request table 363.

The SCSI command blocks 350, 352, 354 and 362 has associated exemplary ITT value 1, ITT value 2, ITT value 3 and ITT value 4 respectively. The data out block 356 has associated ITT value 2, DataSn value 0 and final (F) value 0, for example. The data out block 358 has associated ITT value 2, DataSn value 1 and final (F) value 0, for example. The data out block 360 has associated ITT value 2, DataSn value 2 and final (F) value 1, for example. The TCP transition table 389 may comprise a set of sequence blocks 390, 392 and 394. The sequence block 390 may correspond to a sequence 2000 and length 800, for example. The sequence block 392 may correspond to a sequence 2800 and length 3400, for example. The sequence block 394 may correspond to a sequence 6200 and length 200, for example. There may not be a fixed association between a SCSI PDU and a TCP bit, and a bit may have a fixed value associated with it.

The TCP transition table 389 may be adapted to store a copy of requests sent to the iSCSI request table 363, to enable it to retransmit the TCP bits. The iSCSI data out chain 395 may comprise a set of corresponding data out blocks 396, 398 and 399. The data out block 396 has associated ITT value 2, final (F) value 0, DataSn value 0 and offset value 0, for example. The data out block 398 has associated ITT value 2, final (F) value 0, DataSn value 1 and offset value 1400, for example. The data out block 399 has associated ITT value 2, final (F) value 0, DataSn value 2 and offset value 2400, for example. The iSCSI data out chain 395 may be adapted to receive a R2T signal from the R2T block 380, for example, compare it with previously stored data and generate a data out (DO) signal to the data out block 356, for example. The data acceleration layer may be capable of handling the R2T. The ITT field of the R2T PDU 380 may be used to lookup the iSCSI request table 363. The iSCSI request table entry 366 and the associated buffer B2 may be identified. The data acceleration layer formats the data out PDUs 356, 358 and 360. The data out PDUs 356, 358 and 360 may be transmitted out. The iSCSI upper layer may not involve R2T processing.

The data in block 372 has associated ITT value 1, DataSn value 0 and final F value 1, for example. The data in block 376 has associated ITT value 3, DataSn value 0 and final (F) value 0, for example. The data in block 378 has associated ITT value 3, DataSn value 1, final (F) value 1 and a status signal (Status), for example. The data in block 382 has associated ITT value 4, DataSn value 0 and final (F) value 0, for example. The data in block 384 has associated ITT value 4, DataSn value 1, final (F) value 1 and a status signal (Status), for example. The status indicator block 374 has associated ITT value 1 and a status signal (Status), for example, and the status indicator block 388 has associated ITT value 2 and a status signal Status, for example. The request to transmit (R2T) block 380 may be adapted to send a R2T signal to the iSCSI data out chain block 396, for example, which may further send a data out signal to the data out block 356. The asynchronous message block may be adapted to send an asynchronous message signal to the fixed size buffer 336, for example.

In operation, the iSCSI chimney may comprise a plurality of control structures that may describe the flow of data between an initiator and the hardware in order to enable a distributed implementation. The SCSI construct may be blended on the iSCSI layer so that it may be encapsulated inside TCP data before it is transmitted to the hardware for data acceleration. There may be a plurality of read and write operations, for example, three read operations and a write operation may be performed to transfer a block of data from the initiator to a target. The read operation may comprise information, which describes an address of a location where the received data may be placed. The write operation may describe the address of the location from which the data may be transferred. The SCSI request list 301 may comprise a set of command descriptor blocks 302, 304, 306 and 308 for read and write operations and each CDB may be associated with a corresponding buffer B4 310, B3 312, B2 314 and B1 316 respectively. The driver may be adapted to recode the information stored in the SCSI request list 301 into the iSCSI command chain 319. The iSCSI command chain 319 may comprise a set of command sequence blocks (CSBs) 320, 322, 324 and 326 and each CSB may be converted into a PDU in the iSCSI PDU chain 327, which may comprise a set of CDBs 328, 330, 332 and 334, respectively.

The iSCSI command chain CDB 320 may be utilized to send a read command to the SCSI command block 350 and simultaneously updates the TCP transition table sequence block 390 and the iSCSI request table command sequence block 364. The iSCSI request table 363 may be associated with the same set of buffers as the SCSI request list in the iSCSI upper layer. The iSCSI command chain CDB 322 may be utilized to update the iSCSI request table command sequence block 366 associated with buffer B2 314, create a header and may send out a write command to the SCSI command block 352. The iSCSI command chain CDB 324 may be utilized to send a read command to the SCSI command block 354 and simultaneously updates the TCP transition table sequence block 392 and the iSCSI request table command sequence block 368.

The data in block 372 may indicate receipt of data from the initiator and compare the received data with the data placed in the buffer B1 316 associated with the iSCSI request table CSB 364 and place the received data in the buffer B1 316. The status indicator block 374 may send a status signal to the iSCSI completion chain status block 342, which indicates the completion of the read operation and free the iSCSI request table CSB 364. The data in block 376 may indicate the receipt of data from the initiator and compare the received data with the data placed in the buffer B3 312 associated with the iSCSI request table CSB 368 and place the received data in the buffer B3 312. The status indicator block 378 may be utilized to send a status signal to the iSCSI completion chain status block 344, which indicates the completion of the read operation and free the iSCSI request table CSB 368.

When handling the iSCSI write commands, the iSCSI host driver may submit the associated buffer information with the allocated ITT to the iSCSI offload hardware. The iSCSI host driver may deal with the completion of the iSCSI write command, when the corresponding iSCSI response PDU is received. The iSCSI target may request the write data at any pace and at any negotiated size by sending the initiator one or multiple iSCSI ready to transfer (R2T) PDUs. In iSCSI processing, these R2T PDUs may be parsed and the write data as specified by the R2T PDU may be sent in the iSCSI data out PDU encapsulation. With iSCSI chimney, R2T PDUs may be handled by the iSCSI offload hardware that utilizes ITT in R2T PDU to locate the outstanding write command, and use offset and length in R2T PDU to formulate the corresponding data out PDU. The processing for the iSCSI host driver may be reduced by not involving the host driver.

The R2T block 380 may be adapted to send a R2T signal to the iSCSI data out chain block 396 with DataSn value 0, for example, which may be adapted to send a data out signal to the data out block 356 with DataSn value 0 and final F value 0, for example. The R2T block 380 may be adapted to simultaneously update the iSCSI data out chain block 396 and the iSCSI request table command sequence block 366. The iSCSI request table command sequence block 366 may compare the received data with the data placed in the buffer B2 314 and transmit the data to be written to the data out block 356. The iSCSI data out chain 395 may be adapted to record write commands being transmitted and compare it with a received R2T signal. The R2T block 380 may be adapted to send a R2T signal to the iSCSI data out chain block 398 with DataSn value 1, for example, which may be utilized to send a data out signal to the data out block 358 with DataSn value 1 and final (F) value 0, for example. The R2T block 380 may be further adapted to send a R2T signal to the iSCSI data out chain block 399, which may have DataSn value 2, for example. The R2T block 380 may further send a data out signal to the data out block 360, which may have DataSn value 2 and final (F) value 1, for example.

The iSCSI command chain CDB 326 may be utilized to send a read command to the SCSI command block 362, which may simultaneously update the TCP transition table sequence block 394 and the iSCSI request table command sequence block 370. The data in block 382 may indicate the receipt of data from the initiator and compare the received data with the data placed in the buffer B4 310 associated with the iSCSI request table CSB 370 and place the received data in the buffer B4 310. The status indicator block 384 may send a status signal to the iSCSI completion chain status block 346, which may indicate the completion of the read operation and free the iSCSI request table CSB 370. The status indicator block 388 may send a status signal to the iSCSI completion chain status block 348, which may indicate completion of the write operation and free the iSCSI request table CSB 366. When the CPU enters idle mode, the iSCSI completion chain 341 may receive the completed status commands for the read and write operations and the corresponding buffers and entries in the iSCSI request table 363 may be freed for the next set of operations.

Figure 4:
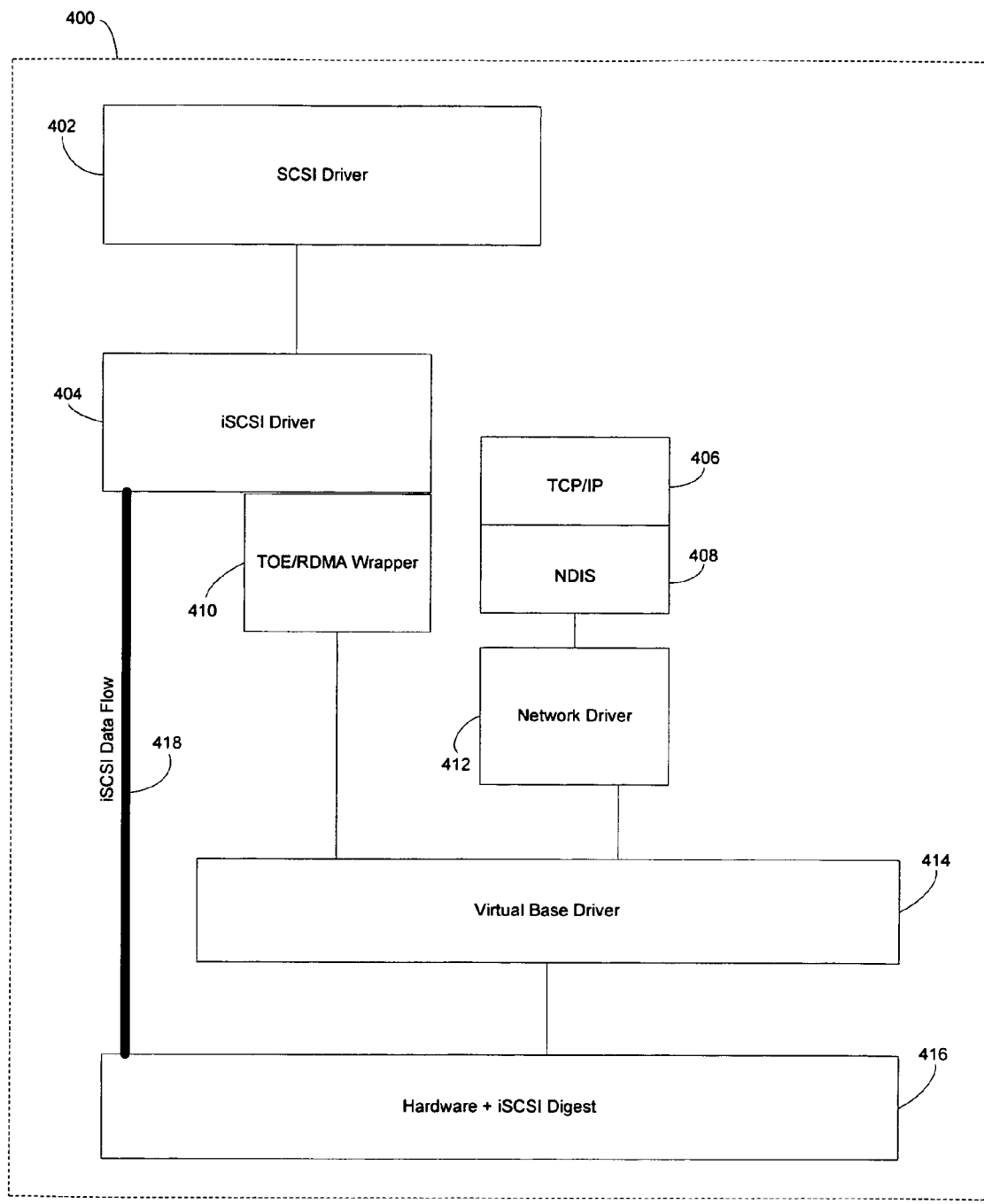
FIG. 4 is a block diagram illustrating iSCSI offload of data over a TCP offload engine (TOE) including support for a cyclic redundancy check (CRC), in accordance with an embodiment of the invention.

FIG. 4 is a block diagram illustrating iSCSI offload of data over a TCP offload engine (TOE) including support for a cyclic redundancy check (CRC), in accordance with an embodiment of the invention. Referring to FIG. 4, there is shown a storage stack 400. The storage stack 400 may comprise a SCSI driver block 402, an iSCSI driver block 404, a TOE/RDMA wrapper block 410, a TCP/IP block 406, a NDIS block 408, a network driver block 412, a virtual base driver block 414, a hardware block with iSCSI digest 416 and an iSCSI chimney 418.

The SCSI driver block 402 may comprise a plurality of functional blocks, for example, a disk class driver block 218 [FIG. 2a] and the iSCSI software initiator block 222 that may be adapted to support the use of accelerated network adapters to offload TCP overhead from a host processor to the network adapter. The iSCSI driver block 404 may comprise a plurality of port drivers that may be adapted to manage different types of transport, depending on the type of adapter, for example, USB, SCSI or Fibre Channel (FC) in use. The TCP/IP block 406 utilizes transmission control protocol/internet protocol to provide communication across interconnected networks. The network driver interface specification NDIS block 408 may comprise a device-driver specification that may be adapted to provide hardware and protocol independence for network drivers and offer protocol multiplexing so that multiple protocol stacks can coexist on the same host.

The network driver block 412 may comprise routines utilized to interface with the storage adapter's hardware and may be coupled to the NDIS block 408 and the virtual base driver block 414. The iSCSI chimney 418 may comprise a plurality of control structures that may describe the flow of data between the iSCSI driver block 404 and the hardware block 416 in order to enable a distributed implementation. The virtual base driver block 414 may comprise a plurality of drivers that facilitate the transfer of data between the iSCSI driver block 404 and the hardware block 416 via the iSCSI chimney 418. The hardware block 416 may comprise suitable logic and/or circuitry that may be adapted to process received data from the drivers and other devices coupled to the hardware block 416. The hardware block 416 may also be adapted to perform a cyclic redundancy check (CRC) to check the integrity of a block of data. A CRC character may be generated at the transmission end. The transmitting device may calculate a digest value and append it to the data block. The receiving end may make a similar calculation and compare its results with the added character and if there is a difference, the receiving end may request retransmission of the block of data.

The SCSI driver block 402 may be coupled to the iSCSI driver block 404. The iSCSI driver block 404 may be coupled to the TOE/RDMA wrapper block 410 and the hardware block with iSCSI digest 416 via the iSCSI chimney 418. The TOE/RDMA wrapper block 410 may be coupled to the virtual base driver block 414. The TCP/IP block may be coupled to the NDIS block 408 and the network driver block 412. The network driver block 412 may be coupled to the virtual base driver block 414. The virtual base driver block 414 may be coupled to the hardware block with iSCSI digest 416.

Figure 5:
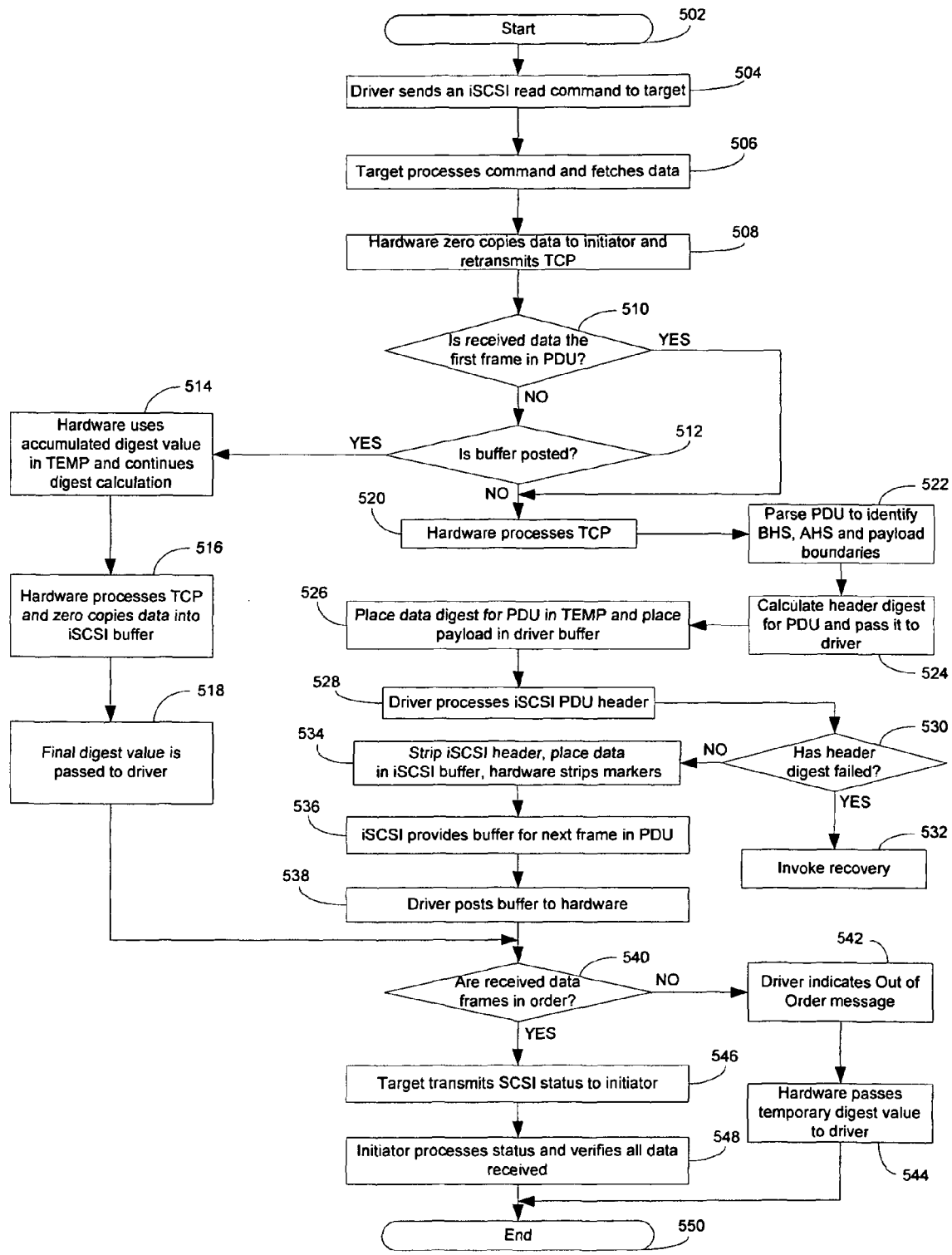
FIG. 5 is a flowchart illustrating detailed steps involved in performing SCSI read operations via a TCP offload engine (TOE) including support for a cyclic redundancy check (CRC), in accordance with an embodiment of the invention.

FIG. 5 is a flowchart illustrating exemplary steps for performing a SCSI read operation over a TCP offload engine (TOE) including support for a cyclic redundancy check (CRC), in accordance with an embodiment of the invention. Referring to FIG. 5, the exemplary steps begin with step 502. In step 504, the driver may send an iSCSI read command to the target. The iSCSI read command may comprise an initiated task tag (ITT), a SCSI read command descriptor block (CDB) and the length of the data stream. In step 506, the target may receive the iSCSI read command from the initiator, process it and fetch data from a storage device. In step 508, the hardware may zero copy the data to the initiator and retransmit TCP to the initiator. The data sent to the initiator may comprise an ITT, a data sequence number (DataSn) and a buffer offset value. In step 510, the initiator checks if the received data is the first frame in the protocol data unit (PDU). If not, the control passes to step 512, where the initiator checks if the buffer has been posted. If the buffer has been posted, control passes to step 514, where the hardware may utilize the accumulated digest value in a storage buffer, for example, a temporary storage buffer TEMP, and continue digest calculation.

In step 516, the hardware may process the TCP and zero copy data into an iSCSI buffer. In step 518, the final digest value may be passed to the driver. Control then passes to step 540. If the buffer is not posted, control passes to step 520, where the hardware processes the TCP. If the received data is the first frame in the protocol data unit in step 510, control passes to step 520. In step 522, the protocol data unit (PDU) may be parsed to determine the basic header structure (BHS), the additional header structure (AHS) and the payload boundaries. In step 524, the header digest for the PDU may be calculated and passed on to the driver. In step 526, the data digest for the PDU may be stored in a storage buffer, for example, a temporary storage buffer TEMP and the payload may be placed in a driver buffer.

In step 528, the driver may process the iSCSI PDU header and in step 530 the driver may check if the header digest has failed. If the header digest has failed, in step 532, a recovery procedure may be invoked. The recovery procedure may involve a set of operations to be performed in hardware and/or software to recover from an out-of-order (OOO) situation. If the header digest has not failed in step 530, then in step 534, the iSCSI header may be stripped and data may be placed in an iSCSI buffer. The hardware may strip any markers previously placed. In step 536, the iSCSI protocol may provide a buffer for the next frame in the PDU and in step 538, the driver may post the buffer to hardware. In step 540, the initiator may check if the received data frames are in the correct order. If not, in step 542, the driver may indicate an out-of-order (OOO) message and in step 544, hardware may pass a temporary digest value to driver and control then passes to end step 550. If the received data frames are in the correct order, in step 546, the target may transmit a SCSI status signal to the initiator. In step 548, the initiator may process the received SCSI status signal from the target, verify the received data and control then passes to the end step 550.

Figure 6:
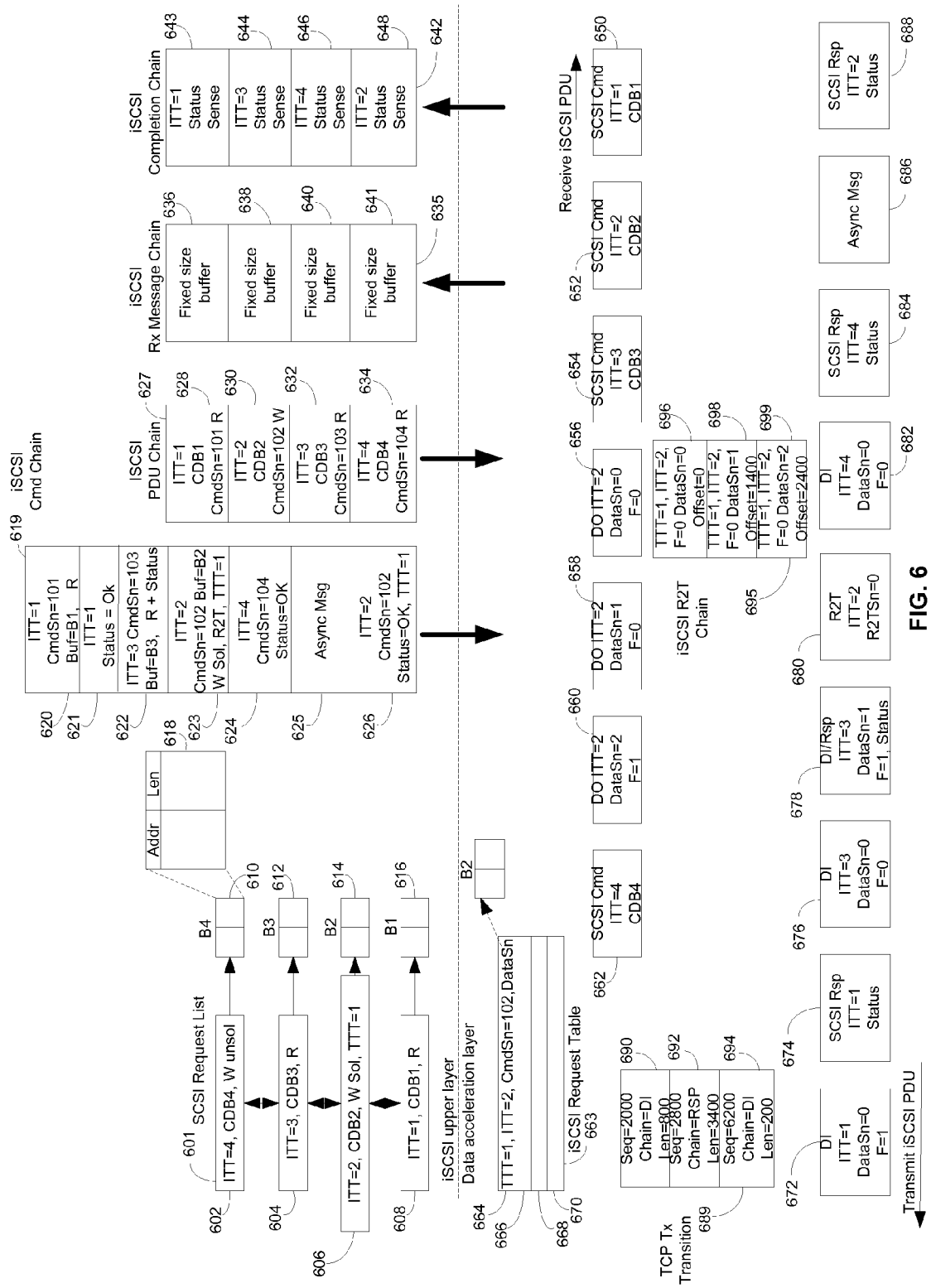
FIG. 6 is a block diagram of an exemplary iSCSI chimney on the target side, in accordance with an embodiment of the invention.

FIG. 6 is a block diagram of an exemplary iSCSI chimney on the target side, in accordance with an embodiment of the invention. Referring to FIG. 6, there is shown, an iSCSI request list 601 received from the initiator on this TCP connection, a set of buffers B1 616, B2 614, B3 612 and B4 610, each buffer, for example, B4 610 has a list of physical buffers addresses and lengths associated with it, a iSCSI command chain 619, an iSCSI PDU chain 627, an iSCSI Rx message chain 635 an iSCSI completion chain 642 in the iSCSI upper layer representing state maintained by a software driver or on HBA in some cases. Also shown in FIG. 6 is the state maintained by the hardware: an iSCSI request table 663, a set of SCSI command blocks 650, 652, 654 and 662, a set of data out blocks 656, 658 and 660, a TCP transition table 689, an iSCSI R2T chain 695, a set of data in blocks 672, 676, 678, 682, 684, a set of status indicator blocks 674 and 688, a request to transmit (R2T) block 680 and an asynchronous message block 686 in the data acceleration layer.

The SCSI request list 601 may comprise a set of command descriptor blocks (CDBs) 602, 604, 606 and 608 received from the Initiator. The iSCSI command chain 619 may comprise a set of command sequence blocks 620, 621, 622, 623, 624, 625 and 626. The iSCSI PDU chain 627 may comprise a set of CDBs 628, 630, 632 and 634. The iSCSI message chain 635 may comprise a set of fixed size buffers 636, 638, 640 and 641. The iSCSI completion chain 642 may comprise a set of status blocks 643, 644, 646 and 648. The iSCSI request table 663 may comprise a set of command sequence blocks 664, 666, 668 and 670. The TCP transition table 689 may comprise a set of sequence blocks 690, 692 and 694 and the iSCSI R2T chain 695 may comprise a set of R2T blocks 696, 698 and 699.

The command descriptor block (CDB) 602 has an initiator task tag (ITT) value 4, corresponding to CDB4 and performs an unsolicited write operation, for example. The CDB 304 has an ITT value 3, corresponding to CDB3 and performs a read operation, for example. The CDB 306 has an ITT value 2, corresponding to CDB2 and performs a solicited write operation, for example and the CDB 308 has an ITT value 1, corresponding to CDB1 and performs a read operation, for example. Each of the CDBs 602, 604, 606 and 608 may be mapped to a corresponding buffer B4 610, B3 612, B2 614 and B1 616 respectively. Each of the buffers B4 610, B3 612, B2 614 and B1 616 may be represented as shown in block 618 with an address of a data sequence to be stored and its corresponding length. The ITT is managed by data acceleration layer on the initiator while TTT is managed by the data acceleration layer on the target. Before an iSCSI upper layer submits a R2T to the initiator, it requests the data acceleration layer for the TTT value. TTT uniquely identifies the R2T command associated with a future data out received from the initiator. TTT is chosen such that when a corresponding iSCSI PDU, for example, an iSCSI data out PDU arrives, the data acceleration layer can readily identify the entry inside iSCSI request table 663 using TTT or portion of TTT.

The iSCSI command chain 619 may comprise a set of exemplary command sequence blocks (CSBs) 620, 621, 622, 623, 624, 625 and 626. The CSB 620 has associated ITT value 1, command sequence (CmdSn) value 101, buffer B1 616 and is a read operation, for example. The CSB 621 has associated ITT value 1, and is the status response for the read operation, for example. The CSB 622 has associated ITT value 3, command sequence (CmdSn) value 103, buffer B3 612 and is a read operation along with its status, for example. The CSB 623 has associated ITT value 2, CmdSn value 102, buffer B2 614 and is a R2T corresponding to a write operation, for example. The CSB 624 has associated ITT value 4, CmdSn value 104 and is a status response for a read operation, for example. The CSB 625 is a asynchronous message, for example. The CSB 626 has associated ITT value 2, and is the Status response for the solicited write operation, for example. The iSCSI PDU chain 627 may comprise a set of exemplary CDBs 628, 630, 632 and 634. The CDB 628 has associated ITT value 1, CmdSn value 101 and read operation, for example. The CDB 630 has associated ITT value 2, CmdSn value 102 and write operation, for example. The CDB 632 has associated ITT value 3, CmdSn value 103 and read operation, for example. The CDB 634 has associated ITT value 4, CmdSn value 104 and is a read operation, for example. The iSCSI message chain 635 may comprise a set of exemplary fixed size buffers 636, 638, 640 and 641. The iSCSI completion chain 642 may comprise a set of status blocks 643, 644, 646 and 648 and may have corresponding ITT value 1, ITT value 3, ITT value 4 and ITT value 2 respectively, for example.

The iSCSI request table 663 may comprise a set of command sequence blocks 664, 666, 668 and 670. The CSB 664 with TTT value of 1 is associated with ITT value 2, CmdSn value 102, data sequence (DataSn) and buffer B2, for example. By arranging the commands in the iSCSI request table 663, the whole TTT or portion of the TTT may be chosen as the index to the entry inside iSCSI request table 663. Since only data bearing commands, R2T pointing to a data out are given TTT values, all other commands may not be addressed by the data acceleration layer saving search time and hardware resources. When a command is completed, the corresponding iSCSI request table entry may be marked as completed without re-arranging other commands. Commands 620, 622, 624 and 626 may be completed in any order. Once the iSCSI request table entry is marked completed, data acceleration layer will stop any further data placement into associated buffer.

The SCSI command blocks 650, 652, 654 and 662 has associated exemplary ITT value 1, ITT value 2, ITT value 3 and ITT value 4 respectively. The data out block 656 has associated ITT value 2, DataSn value 0 and final (F) value 0, for example. The data out block 658 has associated ITT value 2, DataSn value 1 and final (F) value 0, for example. The data out block 660 has associated ITT value 2, DataSn value 2 and final (F) value 1, for example.

The TCP transition table 689 may comprise a set of sequence blocks 690, 692 and 694. It may be corresponding to the transmit iSCSI PDU. The sequence block 690 may correspond to a sequence 2000 and length 800, for example. The sequence block 692 may correspond to a sequence 2800 and length 3400, for example. The sequence block 694 may correspond to a sequence 6200 and length 200, for example. There may not be a fixed association between a SCSI PDU and a TCP bit, and a bit may have a fixed value associated with it.

The TCP transition table 689 may be adapted to store a copy of requests sent to the iSCSI request table 663, to enable it to retransmit the TCP bits. The iSCSI R2T chain 695 may comprise a set of corresponding data out blocks 696, 698 and 699. The data out block 696 has associated TTT value 1, ITT value 2, final (F) value 0, DataSn value 0 and offset value 0, for example. The data out block 698 has associated TTT value 1, ITT value 2, final (F) value 0, DataSn value 1 and offset value 1400, for example. The data out block 699 has associated TTT value 1, ITT value 2, final (F) value 0, DataSn value 2 and offset value 2400, for example. The iSCSI R2T chain 695 may be adapted to receive a signal from the DataOut block 656 and 658, for example, compare it with previously stored data and associate it with the iSCSI Request Table 663 to find the buffer to store the payload of the DataOut right location inside buffer B2 614. Handling of R2T is done at data acceleration layer. The TTT field or portion of it of the R2T PDU 680 may be used to lookup the iSCSI Request Table 663. Request 664 may be identified and so is the associated buffer B2. Data acceleration layer may strip off the headers of the DataOut PDU 656, 658 and 660 and places them in the right offset inside buffer B2. The iSCSI request table 663 utilizes cells in the iSCSI R2T chain 695 to store the control information for pieces of data out that has been received so far. The iSCSI upper layer may not be involved in any placement of data associated with solicited data out.

The data in block 672 has associated ITT value 1, DataSn value 0 and final F value 1, for example. The data in block 676 has associated ITT value 3, DataSn value 0 and final (F) value 0, for example. The data in block 678 has associated ITT value 3, DataSn value 1, final (F) value 1 and a status signal (Status), for example. The data in block 682 has associated ITT value 4, DataSn value 0 and final (F) value 0, for example. The data in block 684 has associated ITT value 4, DataSn value 1, final (F) value 1 and a status signal (Status), for example. The status indicator block 674 has associated ITT value 1 and a status signal (Status), for example, and the status indicator block 688 has associated ITT value 2 and a status signal Status, for example. The ready to transfer (R2T) block 680 may be adapted to send a signal to the iSCSI request table block 664, for example, as 664 records the association of TTT value 1 with ITT value 2 and specific offset and length requested by the target. When the target sends out its ready to transfer (R2T) block 680, it may signal iSCSI request table 663 to help it allocate the right entry in the iSCSI request table 663. The asynchronous message block 625 may be adapted to send an asynchronous message signal to the fixed size buffer 636, for example. An unsolicited data out from the initiator may also send a signal to the iSCSI Rx Message Chain 635.

In operation, the iSCSI chimney may comprise a plurality of control structures that may describe the flow of data between a target and the hardware in order to enable a distributed implementation. The SCSI construct (e.g. for status) may be blended on the iSCSI layer so that it may be encapsulated inside TCP data before it is transmitted to the hardware for data acceleration. There may be a plurality of read and write operations, for example, two read operations, one solicited write operation and one unsolicited write operation may be performed to transfer blocks of data from the initiator to a target and vice versa. The read operation may comprise information, which describes an address of a location from which the data may be transmitted. The solicited write operation may describe the address of the location where received data may be placed. The unsolicited write operation may describe the fixed size buffer in the iSCSI Rx Message chain 635 where received data may be placed. The SCSI request list 301 may comprise a set of command descriptor blocks 602, 604, 606 and 608 for read and write operations and each CDB may be associated with a corresponding buffer B4 610, B3 612, B2 614 and B1 616 respectively. Since 602 is an unsolicited request from the initiator, the target may have not allocated any named buffer for it, so B4 610 may or may not be associated with 602. The driver may be adapted to recode the information stored in the SCSI request list 601 into the iSCSI command chain 619. The iSCSI command chain 619 may comprise a set of command sequence blocks (CSBs) 620, 621, 622, 623, 624, 625 and 626 and each CSB may be converted into a PDU in the iSCSI PDU chain 627, which may comprise a set of CDBs 628, 630, 632 and 634, respectively.

The iSCSI command chain CDB 620 may be utilized to format a Data In response to the SCSI command block 650 and simultaneously updates the TCP transition table sequence block 690. The iSCSI request table 663 may be associated with the same set of buffers as the SCSI request list in the iSCSI upper layer. The iSCSI command chain CDB 621 may be utilized to format a status reply to the SCSI command block 650 and simultaneously updates the TCP transition table sequence block 690. The iSCSI command chain CDB 622 may be utilized to format a data in response along with status reply to the SCSI command block 654 and simultaneously updates the TCP transition table sequence block 690. The iSCSI command chain CDB 623 may be utilized to update the iSCSI request table command sequence block 666 associated with buffer B2 614, create a header and may send out an R2T command in response to the SCSI command block 652. The iSCSI command chain CDB 624 may be utilized to send a Data In response to the SCSI command block 654 and simultaneously update the TCP transition table sequence block 692 and the iSCSI request table command sequence block 668.

The data in block 650 may be recorded into the iSCSI message chain 635. The driver may check the iSCSI message chain 635 and create 608 data block and allocate a buffer B1. The driver may construct 620 data block in the iSCSI command chain 619. The hardware may use the enclosed information to format a Data In PDU and send data block 672 to the initiator. When the hardware signals the driver a successful completion of transmission of data block 672, by placing a completion indication 643 into the iSCSI completion chain 642. The driver may post block 621 that triggers the hardware sending of block 674 SCSI status PDU to the initiator. The hardware may post another completion into 642 that may trigger the driver to free up the resources associated with blocks 608 and buffer 616. When the data in block 652 is received, it may be recorded into block iSCSI message chain 635. The driver in turn allocates an entry 606 in the SCSI request list 601, allocate a buffer B2 614 and ask the hardware to allocate an entry in the iSCSI request table 663. Simultaneously, the hardware may receive block 654 and post it to the iSCSI receive message chain 635. The driver acts on the command, creates entry 604 and allocates a buffer B3 612. The driver may construct 622 data block in iSCSI command chain 619. The hardware may use the enclosed information to format a Data In PDU and send 676 to the initiator. As the data may be longer than what fits in one PDU the hardware creates block 678 as well. The driver may have included in 622 an indication for the hardware to use collapsed status. The last Data In PDU may also include the SCSI status information. A completion may be posted by the hardware to 642 when the transmission is completed successfully.

At this point the hardware may send to the driver a TTT value 1, in response to its request relating to 652. The driver may now complete the operation started on behalf of reception of 652 and complete the creation of 606 and the allocation of B2 614. The driver may now post block 623 into 619 as a command for the hardware to send an R2T message to the initiator. Prior to sending the message 680, the hardware populates entry 664 in the iSCSI request table 663, using TTT value 1 as index. This entry includes the allocation of TTT value 1 to the operation and its association with the initiator parameters found in 652. Next block 680 containing the R2T PDU may be sent to the initiator by the hardware.

The initiator replies to 680, by sending 656, 658 and 660. The target uses the TTT value 1 embedded in these messages to associate them with entry 664 in the iSCSI request table 663. As each of the incoming Data Out massages may constitute a plurality of TCP segments the hardware uses 695 to store the information till the whole task with Data Out is completed. At this point the entries inside 695 may be cleared and the hardware posts a completion indication into 642.

When the data in block 662 is received, it is also recorded into 635. As the data in 662 is un-solicited no buffer may be pre allocated for it. The hardware stores the data along with the command in 635. The driver may create entry 602 and allocate a named buffer B4 610 for the data in a later time. The driver may process the PDU, copy the data in 635 into 610. The drive creates entry 624 containing SCSI Status response to be sent to the initiator. The hardware creates the data block 684 and transmits it to the initiator.

The driver may create another entry 625 that causes the hardware to send block 686 to the initiator, corresponding to the asynchronous message. Finally the completion posted on 642 for the request stored in 664 reaches the driver, the driver posts entry 626 on 619. When the hardware processes entry 626, it creates block 688 and sends it to the initiator. When the initiator acknowledges reception of 688, the hardware clears its entry 664 in the iSCSI request table 663 making TTT value 1 available for another operation.

Figure 7:
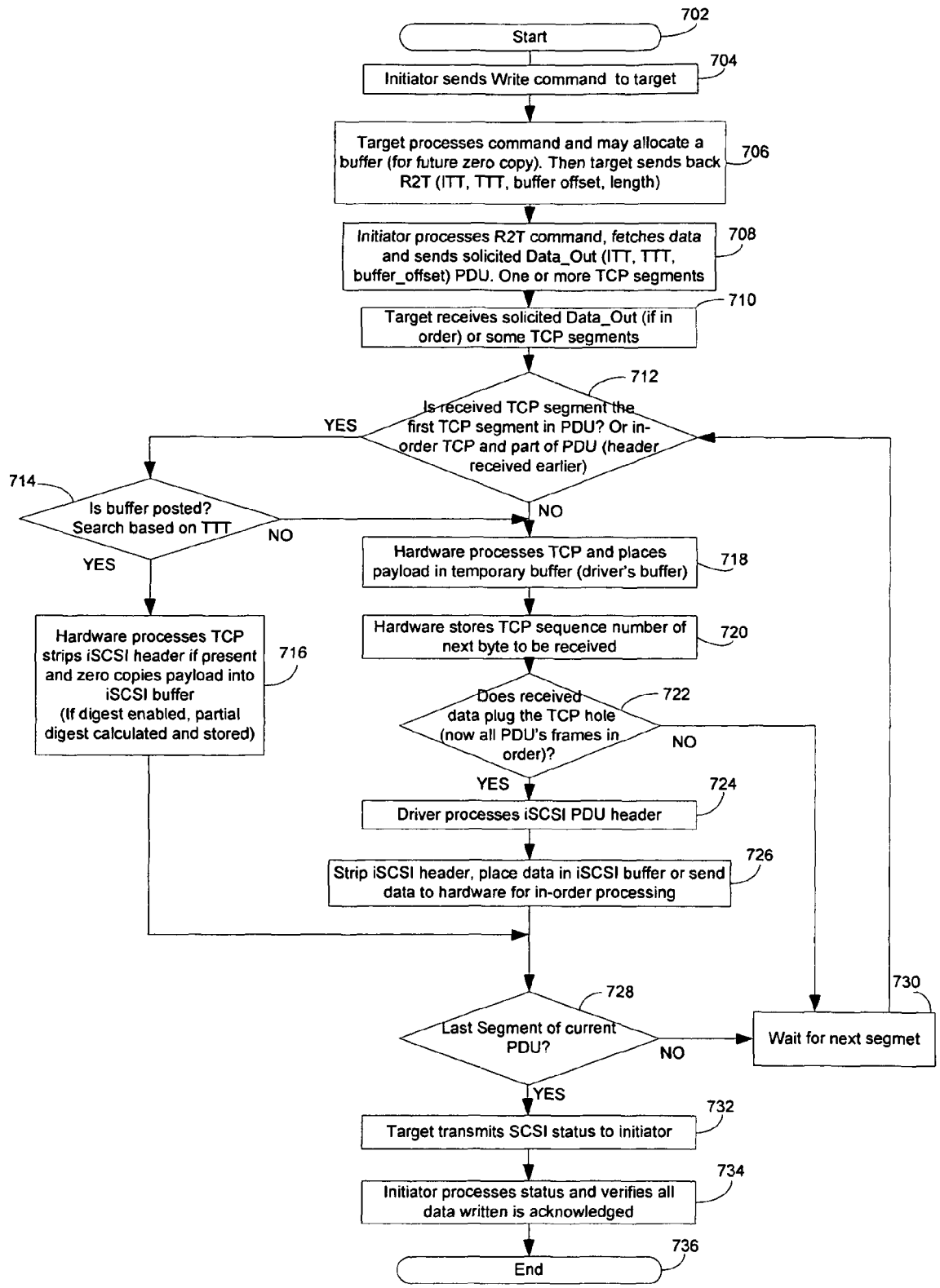
FIG. 7 is a flowchart illustrating detailed steps involved in performing SCSI write operations on a target via a TCP offload engine (TOE) adapted to support iSCSI chimney, in accordance with an embodiment of the invention.

FIG. 7 is a flowchart illustrating detailed steps involved in performing SCSI write operations on a target via a TCP offload engine (TOE) adapted to support iSCSI chimney, in accordance with an embodiment of the invention. Referring to FIG. 7, the exemplary steps may start at step 702. In step 704, a driver may send an iSCSI write command to a target. The iSCSI write command may comprise an initiated task tag (ITT), a SCSI write command descriptor block (CDB) and the length of the data requested. In step 706, the target processes the command and may allocate resources including a buffer for buffering the data. The target may reply by sending back an R2T message including the target's target transfer tag (TTT) to the initiator. In step 708, the initiator processes the R2T command and prepares the relevant data for transmission. Depending on size, data may be encapsulated in one or more PDUs and in one or more TCP segments. In step 710, the target's hardware may receive a TCP segment from the initiator. In step 712, the target hardware may check whether the TCP segment received is in order and whether it comprises the PDU header. The PDU header may be required to decode the required operation as well as to be able to delineate iSCSI header and payload in the PDU. If the TCP segment is in order then control passes to step 714. In step 714, the hardware may consult its tables for entries like 364 in the iSCSI request table 363 holding information for the TTT and ITT cited in the initiator's data out message. If the buffer is posted, control passes to step 716. In step 716, the hardware may strip the headers and zero copy the data to the pre-posted buffers. If the buffer is not posted, control passes to step 718. If the received TCP segment is not the first TCP segment in PDU, control passes to step 718. In step 718, the hardware may only perform TCP level processing. The hardware may place the payload in a temporary buffer. U.S. application Ser. No. 10/652,270 filed Aug. 29, 2003, discloses the handling of out-of-order TCP segments, and is hereby incorporated herein by reference. In step 720, the hardware may store the TCP sequence number of the next byte to be received. In step 722, the hardware checks whether the last received TCP segment plugs the hole it has in its list of received TCP segments. If hole is not plugged, control passes to step 730. In step 730, control waits for another TCP segment and control then passes to step 712. If hole is plugged, control passes to step 724. In step 724, the driver processes the iSCSI PDU header. In step 726, the driver removes the headers update it state and places the data in the buffer and may re-send the now in-order PDU to the hardware for hardware to execute in-order processing.

In case of header and/or data digest, the hardware may also calculate the digest and compare it to those stored inside the TCP segment. Since the PDU maybe longer than one TCP segment the hardware may store the partial digest results and continue the computation when the next in order TCP segment containing the continuation of the current PDU is received. Control is then passed to step 728. In step 728, it may be determined whether this was the last segment in this PDU, as may be determined by its length. If this was not the last segment in the current PDU control passes to step 730. If this was the last segment in the current PDU, control passes to step 732. In step 732, the target transmits a status reply to the initiator based on the iSCSI protocol. In step 734, the initiator may receive the status reply and verifies that all data written is acknowledged. In case there are more TCP segments that are part of this write command that have not been received yet, in step 728 control passes to step 730 waiting for another segment to be received and continues until the next TCP segment is received. Control then passes to end step 736.

Certain embodiments of the invention may be found in a method and system for performing SCSI read operations with a cyclic redundancy check via a TCP offload engine. Aspects of the method may comprise receiving an iSCSI read command from an initiator. Data may be fetched from a buffer based on the received iSCSI read command. The fetched data may be zero copied from the buffer to the initiator and a TCP sequence may be retransmitted to the initiator. A digest value may be calculated, which may be communicated to the initiator. The calculated digest value may be the cyclic redundancy check value. An accumulated digest value stored in a temporary buffer may be utilized to calculate a final digest value, if the buffer is posted. The retransmitted TCP sequence may be processed and the fetched data may be zero copied into an iSCSI buffer, if the buffer is posted. The calculated final digest value may be communicated to the initiator.

The retransmitted TCP sequence may be processed, if the buffer is not posted. An iSCSI protocol data unit may be parsed to identify additional header and a base header. The digest value for a header of the iSCSI protocol data unit may be calculated. The calculated digest value may be communicated to the initiator. The communicated calculated digest value of the header of the iSCSI protocol data unit may be placed in a temporary buffer. The zero copied fetched data may be placed into the buffer. If the calculated digest value of the header of the iSCSI protocol data unit has failed, a recovery procedure may be invoked. If the calculated digest value of the header of the iSCSI protocol data unit has not failed, the header may be stripped from the iSCSI protocol data unit and the zero copied fetched data may be placed in an iSCSI buffer. The iSCSI buffer may be allocated for next frame of the zero copied fetched data in the iSCSI protocol data unit. The iSCSI buffer may be posted to hardware. If the frames of the zero copied fetched data are not in order, an out of order message may be generated. The calculated digest value may be communicated to the initiator. If the frames of the zero copied fetched data are in order, a SCSI status signal may be communicated to the initiator. The transmitted SCSI status signal may be processed and the zero copied fetched data may be verified.

Another embodiment of the invention may provide a machine-readable storage, having stored thereon, a computer program having at least one code section executable by a machine, thereby causing the machine to perform the steps as described above for performing SCSI read operations with a cyclic redundancy check via a TCP offload engine.

In accordance with another embodiment of the invention, a system for performing a SCSI read operation via a TCP offload engine may be provided. In this regard, the system may comprise a target, for example, a iSCSI target 122 [FIG. 1] that receives an iSCSI read command from an initiator, for example an iSCSI software initiator 222 [FIG. 2*a*]. At least one driver may be adapted to fetch data from a buffer based on the received iSCSI read command. The fetched data may be zero copied from the buffer to the initiator 222 and a TCP sequence may be retransmitted to the initiator 222. The at least one driver may calculate a digest value, which may be communicated to the initiator 222. The driver may be adapted to store an accumulated digest value in a temporary buffer that may be utilized for calculating a final digest value, if the buffer is posted. The driver may process the retransmitted TCP sequence and the fetched data may be zero copied into an iSCSI buffer, for example, B1 316, if the buffer is posted. The driver may be adapted to communicate the calculated final digest value to the initiator 222. The driver may process the retransmitted TCP sequence, if the buffer is not posted.

In a further aspect of the system, the driver may be adapted to parse the iSCSI protocol data unit stored in an iSCSI PDU chain 327 to identify additional header and a base header. The at least one driver may calculate the digest value for a header of the iSCSI protocol data unit stored in the iSCSI PDU chain 327. The calculated digest value may be communicated to the initiator 222 by the driver. The driver may be adapted to place the communicated calculated digest value of the header of the iSCSI protocol data unit stored in the iSCSI PDU chain 327 in a temporary buffer. The zero copied fetched data may be placed into the buffer, for example, B1 316. If the calculated digest value of the header of the iSCSI protocol data unit stored in the iSCSI PDU chain 327 has failed, the driver may invoke a recovery procedure.

If the calculated digest value of the header of the iSCSI protocol data unit stored in the iSCSI PDU chain 327 has not failed, the driver may be adapted to strip the header from the iSCSI protocol data unit stored in the iSCSI PDU chain 327 and the zero copied fetched data may be placed in an iSCSI buffer, for example, B1 316. The iSCSI buffer, for example, B1 316 may be allocated for next frame of the zero copied fetched data in the iSCSI protocol data unit stored in the iSCSI PDU chain 327. The iSCSI buffer, for example, B1 316 may be posted to the hardware 416 [FIG. 4].

If the frames of the zero copied fetched data are not in order, the driver may generate an out of order message. The driver may be adapted to communicate the calculated digest value to the initiator. If the frames of the zero copied fetched data are in order a SCSI status signal may be communicated to the initiator 222. For example, in FIG. 3, the driver may send a status signal from the status indicator block 372 to the iSCSI completion chain status block 343, which indicates the completion of the read operation and frees the iSCSI request table CSB 364. The driver may be adapted to process the communicated SCSI status signal and verify the zero copied fetched data.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for performing a SCSI read operation via a TCP offload engine, the method comprising:
   receiving an iSCSI read command from an initiator;
   fetching data from a buffer based on said received iSCSI read command;
   zero copying said fetched data from said buffer to said initiator;
   if said buffer is posted, calculating a final digest value based on an accumulated digest value; and
   if said buffer is not posted, parsing an iSCSI protocol data unit; calculating a header digest value for a header of said iSCSI protocol data unit; and communicating said calculated digest value to said initiator.

2. The method according to claim 1, comprising:
   utilizing an accumulated digest value stored in a temporary buffer for calculating said final digest value, if said buffer is posted;
   processing a retransmitted TCP sequence retransmitted to said initiator and zero copying said fetched data into an iSCSI buffer, if said buffer is posted;
   communicating said calculated final digest value to said initiator; and
   processing said retransmitted TCP sequence retransmitted to said initiator, if said buffer is not posted.

3. The method according to claim 1, comprising:
   identifying an additional header and a base header;
   placing the header digest value in a temporary buffer.

4. The method according to claim 1, comprising placing said zero copied fetched data into said buffer.

5. The method according to claim 1, comprising invoking a recovery procedure if the header digest value has failed.

6. The method according to claim 5, comprising stripping said header from said iSCSI protocol data unit and placing said zero copied fetched data in an iSCSI buffer, if the header digest value has not failed.

7. The method according to claim 6, comprising allocating said iSCSI buffer for a next frame of said zero copied fetched data in said iSCSI protocol data unit.

8. The method according to claim 6, comprising posting said iSCSI buffer to hardware.

9. The method according to claim 1, comprising generating an out of order message, if frames of said zero copied fetched data are not in order.

10. The method according to claim 1, comprising communicating the header digest value to said initiator, if frames of said zero copied fetched data are not in order.

11. A system for performing a SCSI read operation via a TCP offload engine, the system comprising:
    a target that operates to receive an iSCSI read command from an initiator;
    at least one driver that operates to fetch data from a buffer based on said received iSCSI read command;
    said at least one driver operates to zero copy said fetched data from said buffer to said initiator;
    if said buffer is posted, said at least one driver operates to calculate a final digest value based on an accumulated digest value;
    said at least one driver operates to parse an iSCSI protocol data unit; and
    if said buffer is not posted, said at least one driver operates to calculate a header digest value, which is communicated to said initiator.

12. The system according to claim 11, wherein:
    said at least one driver operates to utilize an accumulated digest value stored in a temporary buffer for calculating said final digest value, if said buffer is posted;
    said at least one driver operates to process a retransmitted TCP sequence retransmitted to said initiator and zero copy said fetched data into an iSCSI buffer, if said buffer is posted;
    said at least one driver operates to communicate said calculated final digest value to said initiator; and
    said at least one driver operates to process said retransmitted TCP sequence retransmitted to said initiator, if said buffer is not posted.

13. The system according to claim 11, wherein:
    said at least one driver operates to identify an additional header and a base header;
    said at least one driver operates to calculate the header digest value for a header of said iSCSI protocol data unit; and
    said at least one driver operates to place the header digest value in a temporary buffer.

14. The system according to claim 11, wherein said at least one driver operates to place said zero copied fetched data into said buffer.

15. The system according to claim 11, wherein said at least one driver operates to invoke a recovery procedure if the header digest value has failed.

16. The system according to claim 15, wherein said at least one driver operates to strip a header from said iSCSI protocol data unit and place said zero copied fetched data in an iSCSI buffer, if the header digest value has not failed.

17. The system according to claim 16, wherein said at least one driver operates to allocate said iSCSI buffer for a next frame of said zero copied fetched data in said iSCSI protocol data unit.

18. The system according to claim 16, wherein said at least one driver operates to post said iSCSI buffer to hardware.

19. The system according to claim 11, wherein said at least one driver operates to generate an out of order message, if frames of said zero copied fetched data are not in order.

20. The system according to claim 11, wherein said at least one driver operates to communicate the header digest value to said initiator, if frames of said zero copied fetched data are not in order.

* * * * *